(12) United States Patent
Cai

(10) Patent No.: US 11,838,823 B2
(45) Date of Patent: Dec. 5, 2023

(54) VOICE SWITCHOVER METHOD AND SYSTEM, AND ELECTRONIC DEVICE

(71) Applicant: HUAWEI TECHNOLOGIES CO., LTD., Guangdong (CN)

(72) Inventor: Shuanglin Cai, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 271 days.

(21) Appl. No.: 17/281,514

(22) PCT Filed: Dec. 29, 2018

(86) PCT No.: PCT/CN2018/125853
§ 371 (c)(1),
(2) Date: Mar. 30, 2021

(87) PCT Pub. No.: WO2020/073536
PCT Pub. Date: Apr. 16, 2020

(65) Prior Publication Data
US 2021/0352560 A1 Nov. 11, 2021

(30) Foreign Application Priority Data
Oct. 9, 2018 (CN) .......................... 201811172286.6

(51) Int. Cl.
*H04W 36/36* (2009.01)
*H04L 65/70* (2022.01)
*H04L 65/1104* (2022.01)

(52) U.S. Cl.
CPC ......... *H04W 36/36* (2013.01); *H04L 65/1104* (2022.05); *H04L 65/70* (2022.05)

(58) Field of Classification Search
CPC .... H04W 36/36; H04L 65/1104; H04L 65/70; H04L 65/1059; H04L 65/1094;
(Continued)

(56) References Cited

U.S. PATENT DOCUMENTS

2012/0263170 A1* 10/2012 Wang ................ H04M 3/42246
370/352
2015/0189426 A1 7/2015 Pang
2016/0309036 A1* 10/2016 Li ....................... H04L 65/1096

FOREIGN PATENT DOCUMENTS

CN 101227482 A 7/2008
CN 101242663 A 8/2008
(Continued)

*Primary Examiner* — Dady Chery
(74) *Attorney, Agent, or Firm* — WOMBLE BOND DICKINSON (US) LLP

(57) ABSTRACT

A voice switchover method, system, and electronic device are described. The voice switchover method may include sending, by a mobile phone or a voice assistant device, voice switchover request information to a VoIP server based on an operation of a user, and switching, by the VoIP server based on the request information, a voice call ongoing on the mobile phone to the voice assistant device near the mobile phone, for example, a smart speaker. According to this method, the user of the mobile phone can be free from the mobile phone, and continue a voice call by using the voice assistant device without interrupting the voice call. Therefore, the method increases voice switchover efficiency, brings convenience to the user, and improves user experience.

20 Claims, 9 Drawing Sheets

(58) Field of Classification Search
CPC .......... H04L 65/1083; H04M 2250/02; H04M 3/42263; H04M 3/58
See application file for complete search history.

(56) References Cited

FOREIGN PATENT DOCUMENTS

| | | |
|---|---|---|
| CN | 101340722 A | 1/2009 |
| CN | 101854598 A | 10/2010 |
| CN | 101227526 B | 3/2011 |
| CN | 101250801 B | 9/2012 |
| CN | 102891886 A | 1/2013 |
| CN | 104427288 A | 3/2015 |
| CN | 105338425 A | 2/2016 |
| CN | 105389118 A | 3/2016 |
| CN | 105516791 A | 4/2016 |
| CN | 105872439 A | 8/2016 |
| CN | 106126182 A | 11/2016 |
| CN | 104348989 B | 11/2017 |
| CN | 104506523 B | 5/2018 |
| WO | 2016160558 A1 | 10/2016 |

\* cited by examiner

VOICE SWITCHOVER METHOD AND SYSTEM, AND ELECTRONIC DEVICE

CROSS-REFERENCE TO RELATED APPLICATIONS

This application is a national stage application of International Application No. PCT/CN2018/125853, filed on Dec. 29, 2018, which claims priority to Chinese Patent Application No. 201811172286.6, filed on Oct. 9, 2018. Both of the aforementioned applications are hereby incorporated by reference in their entireties.

TECHNICAL FIELD

This application relates to the field of mobile communications, and in particular, to a voice switchover method and system, and an electronic device.

BACKGROUND

With development of smart home technologies, a user or a family usually owns a plurality of electronic devices that can communicate with each other. For example, a user may use a same account for login on a mobile phone and electronic devices, such as a smart speaker and a smart television at home, so that a plurality of electronic devices using the same account constitute a local area network (LAN), and all electronic devices in the local area network can communicate with each other through a server.

In this way, the user may choose, based on actual requirements, to use different electronic devices in the local area network to implement a specific function. For example, when the user is at home, the user may use a speaker to obtain an audio resource from the server and play the audio resource; when the user leaves home, the user may use a mobile phone to obtain an audio resource from the server and play the audio resource.

However, when the user needs to continue playing, on the mobile phone, the audio being played on the speaker, the user usually needs to stop, on the speaker, playing the audio being played, and open the audio again on the mobile phone to continue playing. It is clear that such a procedure of voice switchover between a plurality of electronic devices is comparatively complicated, and a voice that is being played in a switchover process is interrupted. Consequently, efficiency of audio playing switchover between the electronic devices is greatly reduced.

SUMMARY

An objective of the present invention is to provide a voice switchover method and system, and an electronic device, so that efficiency of voice (for example, a voice over internet protocol (VoIP) call or audio playing) switchover between electronic devices can be increased, and user experience can be improved.

The foregoing objective and another objective may be achieved by using features in independent claims. Further implementations are apparent from dependent claims, the specification, and the accompanying drawings.

According to a first aspect, a voice switchover method is provided. The method may include: A second electronic device (for example, a smart speaker) detects a voice input of a user. In response to the voice input, the second electronic device establishes a VoIP call with a third electronic device through a VoIP server. A first electronic device (for example, a mobile phone) sends first switchover request information to the VoIP server. The first switchover request information is used to request the VoIP server to switch a VoIP call ongoing on the second electronic device to the first electronic device. The first switchover request information includes a first account (for example, HUAWEI-01), and the first account is used to log in to a device management server. The VoIP server receives the first switchover request information. In response to the first switchover request information, the VoIP server determines that a source device for a VoIP service corresponding to the first account is the second electronic device. The VoIP server switches the VoIP call ongoing on the second electronic device to the first electronic device.

In the foregoing technical solution, the source device for the VoIP service is the smart speaker, and a target device for the VoIP service is the mobile phone. The mobile phone may send the first switchover request information to the VoIP server, so that the VoIP server seamlessly switches the VoIP service ongoing on the smart speaker under the same account to the mobile phone. In a switchover process, the VoIP service is not interrupted, and the user does not need to perform repeated operations between a plurality of devices, thereby increasing efficiency of voice switchover between the plurality of devices and improving user experience.

In a possible embodiment, before the method, the method further includes: using the first account to log in to the device management server on both the first electronic device and the second electronic device. In this case, it indicates that both the two electronic devices are owned by a same user, and it also indicates that both the two electronic devices use a service provided by a same cloud service provider.

In a possible embodiment, that a first electronic device sends first switchover request information to the VoIP server may specifically include: When the first electronic device detects a specific operation of the user, the first electronic device sends the first switchover request information to the VoIP server in response to the specific operation. The specific operation is one of the following operations: flipping a mobile phone, tapping a screen with a knuckle, double-tapping a power key, a preset voice input, or a preset sliding gesture. In this solution, the first electronic device can be triggered only when the user performs a specific operation, to send the first switchover request information. In this way, a voice switchover procedure can be triggered based on an actual requirement of the user, so that the first electronic device becomes more intelligent, and user experience is also improved.

In another possible embodiment, that a first electronic device sends first switchover request information to the VoIP server may specifically include: When the first electronic device detects a specific condition, the first electronic device may send the first switchover request information to the VoIP server in response to the specific condition. The foregoing specific condition may be wireless fidelity (Wi-Fi) signal strength in a (wireless local area network (WLAN) network or Bluetooth signal strength. For example, when the first electronic device detects that the Wi-Fi signal strength is less than a preset threshold, the first electronic device sends the first switchover request information to the VoIP server; or when the first electronic device detects that the Bluetooth signal strength of the second electronic device is less than a preset threshold, the first electronic device sends the first switchover request information to the VoIP server. In this solution, the first electronic device may automatically trigger, based on the detected specific condition, a procedure of sending the first switchover request information. In this way, user participation is reduced, the voice switchover method becomes more intelligent, and voice switchover efficiency is further increased.

In a possible embodiment, the method may further include: The first electronic device sends, to the VoIP server, a response message indicating that the first electronic device successfully joins in the VoIP call. The VoIP server interrupts the VoIP service on the second electronic device after receiving the response message. After the first electronic device such as a mobile phone joins in the VoIP call, there is a three-party VoIP call among the first electronic device, the second electronic device, and the third electronic device. If the VoIP call is switched to the first electronic device for continuing the VoIP call, interrupting the VoIP service on the second electronic device is a method for saving network resources.

In a possible embodiment, that the VoIP server determines that a source device for a VoIP service corresponding to the first account is the second electronic device may specifically include: The VoIP server sends the first account to the device management server. The device management server determines, based on the first account, at least one electronic device on which the first account is used for login. The device management server sends a device identity of the at least one electronic device to the VoIP server. The VoIP server determines, based on the device identity, that a source device on which a VoIP call is ongoing under the first account is the second electronic device.

In a possible embodiment, the determining that a source device on which a VoIP call is ongoing under the first account is the second electronic device may specifically include: When the VoIP server determines, based on the device identity, that there are at least two electronic devices for the source device on which the VoIP call is ongoing under the first account, the VoIP server sends device identities of the at least two electronic devices to the first electronic device. The first electronic device displays at least two options. The at least two options are used to indicate the at least two electronic devices. The first electronic device detects a selection operation performed by the user on one of the options. The option indicates the second electronic device. The first electronic device sends a device identity of the second electronic device to the VoIP server in response to the selection operation. The VoIP server determines, based on the received device identity of the second electronic device, that the source device on which the VoIP call is ongoing under the first account is the second electronic device.

According to a second aspect, a voice switchover system is provided. The system includes a first electronic device, a second electronic device, a device management server, and a VoIP server. The second electronic device is configured to: when detecting a voice input of a user, establish a VoIP call with a third electronic device through the VoIP server. The first electronic device is configured to send first switchover request information to the VoIP server. The first switchover request information is used to request the VoIP server to switch the VoIP call ongoing on the second electronic device to the first electronic device, the first switchover request information includes a first account, and the first account is used to log in to the device management server. The VoIP server is configured to: receive the first switchover request information, and determine that a source device for a VoIP service corresponding to the first account is the second electronic device. The VoIP server is further configured to switch the VoIP call ongoing on the second electronic device to the first electronic device.

In a possible embodiment, the first account is used to log in to the device management server on both the first electronic device and the second electronic device.

In a possible embodiment, the first electronic device is further configured to: when detecting a specific operation of the user, send the first switchover request information to the VoIP server. The specific operation is one of the following operations: flipping a mobile phone, tapping a screen with a knuckle, double-tapping a power key, a preset voice input, or a preset sliding gesture.

In a possible embodiment, that the first electronic device sends first switchover request information to the VoIP server specifically includes: When the first electronic device detects a specific condition, the first electronic device sends the first switchover request information to the VoIP server.

In a possible embodiment, the specific condition is Wi-Fi signal strength in a WLAN network or Bluetooth signal strength. When the first electronic device detects that the Wi-Fi signal strength is less than a preset threshold, the first electronic device sends the first switchover request information to the VoIP server; or when the first electronic device detects that the Bluetooth signal strength of the second electronic device is less than a preset threshold, the first electronic device sends the first switchover request information to the VoIP server.

In a possible embodiment, the first electronic device is further configured to send, to the VoIP server, a response message indicating that the first electronic device successfully joins in the VoIP call. The VoIP server is further configured to interrupt the VoIP service on the second electronic device after receiving the response message.

In a possible embodiment, that the VoIP server determines that a source device for a VoIP service corresponding to the first account is the second electronic device specifically includes: The VoIP server sends the first account to the device management server. The device management server determines, based on the first account, at least one electronic device on which the first account is used for login. The device management server sends a device identity of the at least one electronic device to the VoIP server. The VoIP server determines, based on the device identity, that a source device on which a VoIP call is ongoing under the first account is the second electronic device.

In a possible embodiment, the VoIP server is further configured to: when determining, based on the device identity, that there are at least two electronic devices for the source device on which the VoIP call is ongoing under the first account, send device identities of the at least two electronic devices to the first electronic device. The first electronic device is further configured to display at least two options. The at least two options are used to indicate the at least two electronic devices. The first electronic device detects a selection operation performed by the user on one of the options. The option indicates the second electronic device. The first electronic device is further configured to send a device identity of the second electronic device to the VoIP server. The VoIP server is further configured to determine, based on the received device identity of the second electronic device, that the source device on which the VoIP call is ongoing under the first account is the second electronic device.

In a possible embodiment, the first electronic device is a mobile phone, and the second electronic device is a smart speaker provided with a voice assistant system.

According to a third aspect, an electronic device for voice switchover is further provided. The electronic device has functions of implementing actions of the first electronic device in the foregoing method embodiment. The functions may be implemented by hardware, or may be implemented by hardware by executing corresponding software. The hardware or the software may include one or more modules corresponding to the foregoing functions.

According to a fourth aspect, an electronic device for voice switchover is further provided. The electronic device has functions of implementing actions of the second electronic device in the foregoing method embodiment. The functions may be implemented by hardware, or may be implemented by hardware by executing corresponding software. The hardware or the software may include one or more modules corresponding to the foregoing functions.

It should be understood that in the specification, descriptions about technical features, technical solutions, advantages, or similar expressions do not imply that all features and advantages can be implemented in any single embodiment. On the contrary, it may be understood that descriptions of the features or the advantages mean that at least one embodiment includes specific technical features, technical solutions, or advantages. Therefore, the descriptions of the technical features, the technical solutions, or the advantages in this specification may not necessarily belong to one embodiment. Further, the technical features, technical solutions, and advantages described in the following embodiments may be combined in any appropriate manner. A person skilled in the art understands that an embodiment can be implemented without one or more specific technical features, technical solutions, or advantages in a specific embodiment. In other embodiments, additional technical features and advantages may be further identified in a specific embodiment that does not reflect all the embodiments.

DESCRIPTION OF EMBODIMENTS

Figure 1:
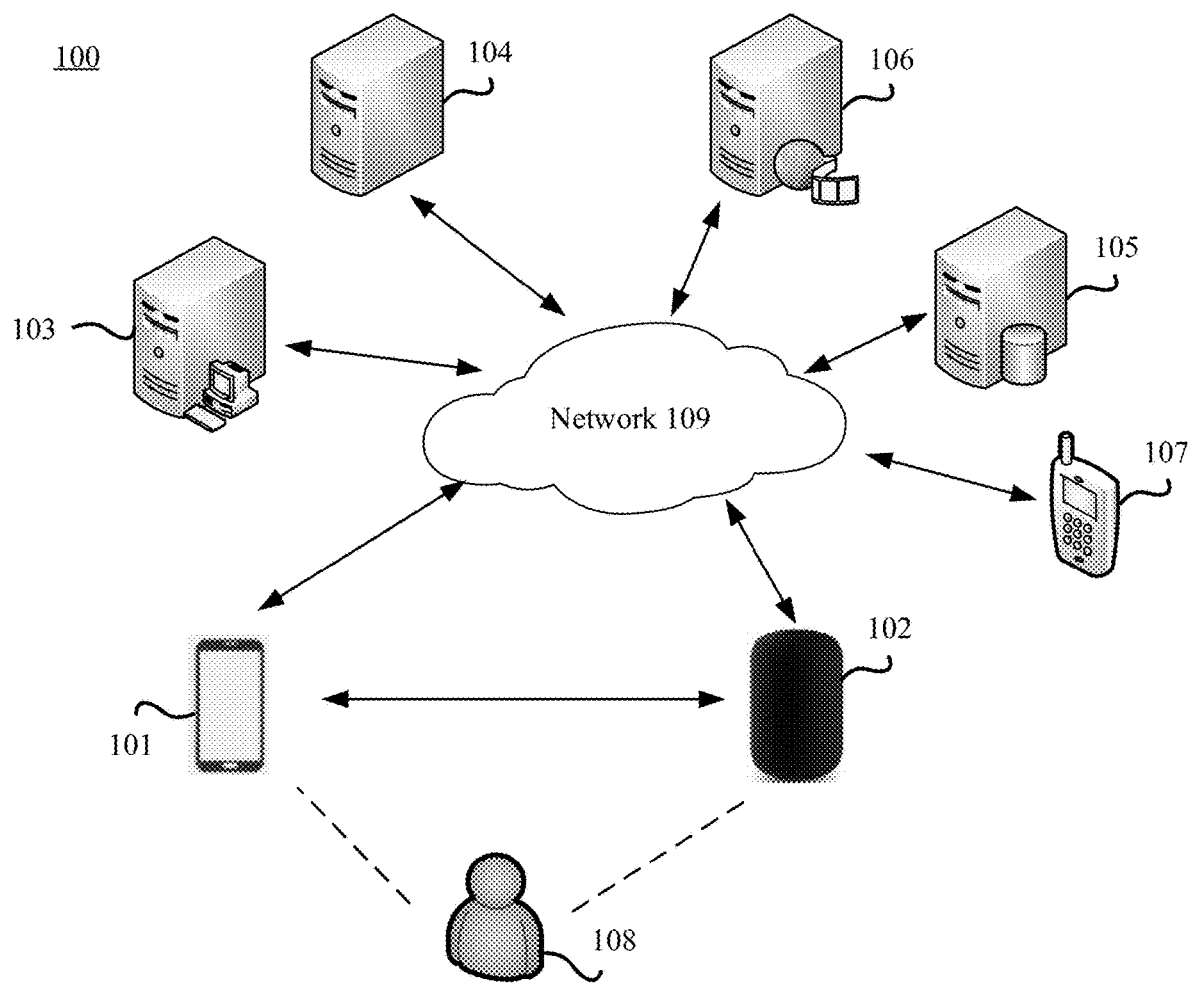
FIG. 1 is a schematic diagram of an implementation scenario of a voice switchover system according to an embodiment.

Terms used in the following embodiments of this application are merely intended to describe specific embodiments, but are not intended to limit this application. As used in the specification and the appended claims of this application, singular expressions "a", "one", "the", "the foregoing", "the", and "this" are intended to also include a plural expression such as "one or more", unless otherwise expressly indicated in its context. It should also be understood that, a term "and/or" used in this application indicates and includes any or all possible combinations of one or more associated listed items.

Reference to "an embodiment", "some embodiments", or the like described in this specification indicates that at least one embodiment of this application includes a specific feature, structure, or characteristic described with reference to the embodiment. Therefore, in this specification, statements such as "in an embodiment", "in some embodiments", "in some other embodiments", and "in other embodiments" that are different do not necessarily refer to a same embodiment, but means "one or more but not all of the embodiments", unless otherwise specifically emphasized. Terms "include", "comprise", "have", and their variants all mean "include but are not limited to", unless otherwise specifically emphasized.

According to the context, a term "when . . . " used in the following embodiments may be interpreted as a meaning of "if . . . ", "after . . . ", "in response to determining . . . ", or "in response to detecting . . . ". Similarly, according to the context, a phrase "when determining . . . " or "if detecting (a stated condition or event)" may be interpreted as a meaning of "if determining . . . ", "in response to determining . . . ", "when detecting (the stated condition or event)", or "in response to detecting (the stated condition or event)".

It should be understood that although terms such as "first electronic device" and "second electronic device" may be used to describe various electronic devices in this specification, these electronic devices should not be limited by these terms. These terms are merely used to distinguish between one electronic device and another electronic device. For example, a first electronic device may be named a second electronic device, and similarly, the second electronic device may be named a first electronic device, without departing from the scope of this application. Both the first electronic device and the second electronic device are electronic devices, but the first electronic device and the second electronic device may not be a same electronic device, or may be a same electronic device in some scenarios.

The following describes an electronic device (for example, a first electronic device or a second electronic device), a user interface used for such an electronic device, and an embodiment in which such an electronic device is used. In some embodiments, the electronic device may be a portable electronic device that further includes other functions such as a function of a personal digital assistant and/or a function of a music player, for example, a mobile phone, a tablet computer, or a wearable electronic device (for example, a smartwatch) having a wireless communication function. An example embodiment of a portable electronic device includes but is not limited to a portable electronic device using iOS®, Android®, Microsoft®, or another operating system. The portable electronic device may alternatively be another portable electronic device, for example, a laptop computer (Laptop) with a touch panel or a touch-sensitive surface. It should be further understood that, in some other embodiments, the electronic device may not be a portable electronic device, but a desktop computer.

The following describes various embodiments of this application in detail with reference to the accompanying drawings.

As shown in FIG. 1, an embodiment of this application provides a voice switchover system 100. The voice switchover system 100 may include one or more electronic devices, for example, a first electronic device (for example, an electronic device 101 in FIG. 1) and a second electronic device (for example, an electronic device 102 in FIG. 1). A specific structure of the first electronic device is described in detail with reference to FIG. 2 in a subsequent embodiment. A specific structure of the second electronic device is described in detail with reference to FIG. 3 in a subsequent embodiment.

As shown in FIG. 1, the electronic device 101 may be connected (for example, in a wired or wireless manner) to the electronic device 102 through one or more networks 109. For example, the one or more communications networks 109 may be a local area network or local area networks, or may be a wide area network or wide area networks (WAN), for example, the internet. The one or more communications networks 109 may be implemented by using any known network communications protocol. The network communications protocol may include various wired or wireless communications protocols, such as Ethernet, a universal serial bus (USB), a firewire, a global system for mobile communications (GSM), a general packet radio service (GPRS), code division multiple access (CDMA), wideband code division multiple access (WCDMA), time division code division multiple access (TD-SCDMA), long term evolution (LTE), Bluetooth, wireless fidelity (Wi-Fi), voice over internet protocol (VoIP), or any other suitable communication protocol.

The voice switchover system 100 may further include a device management server 103. The device management server 103 is configured to manage at least one electronic device (for example, the electronic device 101 and the electronic device 102) that registers with the device management server 103. For example, when the electronic device 101 sends an access request to the device management server 103 through the network 109, the device management server 103 may perform authentication on the electronic device (for example, verify whether an account and a password match). After authentication succeeds, the device management server 103 may allow the electronic device 101 to access data such as storage space, corresponding to the electronic device 101, on the device management server 103. For another example, the device management server 103 configures storage space for the electronic devices (101 and 102). In this way, the electronic devices (101 and 102) may send, to the device management server 103 through the network 109, data (such as pictures and videos) stored in memories of the electronic devices (101 and 102). Then, the device management server stores the received data in the storage space configured for the electronic devices (101 and 102). For example, the device management server 103 may further perform parameter configuration on the electronic devices (101 and 102) through the network 109.

An account may be a credential used by the electronic device to log in to the device management server 103. Some functions of the electronic devices (101 and 102) can be used only when an account is used to log in to the device management server 103 on the electronic devices. For example, functions such as fingerprint recognition, contact synchronization, and a mobile phone finder can be used only when an account is used for login on the electronic device. The foregoing functions cannot be used when no account is used for login. When a user enters an account and a password on the electronic device for login, verification information may be sent to the device management server 103 through the network 109 for verification. It may be understood that, because the device management server is mainly configured to perform authentication on an account of an electronic device, the cloud server may learn of specific electronic devices on which a same account has been used for login.

In some embodiments, the electronic device 101 and the electronic device 102 may be two different electronic devices owned by a same user 108. For example, Thomas owns a smartphone and a voice assistant device (such as a smart speaker). The intelligent voice device is provided with a voice assistant system (the voice assistant system is described in detail in the following embodiments). The voice assistant device may receive a voice input of the user, analyze the language input, and perform other functions. Both the two electronic devices can access the device management server 103 by using an account (for example, HUAWEI-01) owned by Thomas. The device management server 103 may manage each account and access permission between the electronic devices that perform access by using the account. In addition, a same account may also be used for simultaneous login on two or more electronic devices managed by the device management server 103. In this way, the first electronic device (for example, the electronic device 101) and the second electronic device (for example, the electronic device 102) on which a same account is used for login can exchange data and the like through the device management server 103. It may be understood that the user 108 may also log in to the device management server 103 on another electronic device by using the foregoing account, and adjust access permission of the electronic device stored on the device management server 103, for example, delete permission for using the account HUAWEI-01 to log in to the device management server 103 on the electronic device 101 or add permission for using the foregoing account to log in to the device management server 103 on another electronic device.

For example, Table 1 shows some information that is stored on the device management server 103 and that is related to electronic devices on which accounts are used to log in to the device management server 103. It can be learned from Table 1 that the same account (HUAWEI-01) has been used to log in to the device management server 103 on two electronic devices (whose device names are a mobile phone 101 and a smart speaker 102). During login to the device management server 103 on the two electronic devices, respective device identities (for example, international mobile equipment identities (IMEIs) in Table 1) of the two electronic devices may be carried. Alternatively, after the login on the electronic devices, the device management server 103 requests, from the electronic devices, corresponding device identities of the electronic devices, so as to subsequently manage the electronic devices. The device identities are used to uniquely identify the electronic devices, so that another electronic device or server in the network identifies the electronic devices. Common device identities include an international mobile equipment identity (international mobile equipment identity, IMEI), an international mobile subscriber identity (international mobile subscriber identification number, IMSI), a mobile equipment identifier (mobile equipment identifier, MEID), a serial number (serial number, SN), an integrated circuit card identity (Integrate circuit card identity, ICCID), and a media access control layer (media access control, MAC) address or another identity that can uniquely identify an electronic device. In this way, the device management server 103 can identify different electronic devices based on different device identities although a same account is used for login on these electronic devices.

TABLE 1

| Account | Device name | Device identity (for example, an IMEI) | Remarks |
|---|---|---|---|
| HUAWEI-01 | Mobile phone 101 | 862452031854321 | Last login time: 20:19, Nov. 9, 2018 |
| | Smart speaker 102 | 862452031812345 | Last login time: 18:26, Nov. 11, 2018 |
| HUAWEI-02 | Mobile phone 107 | 862452031879999 | Last login time: 20:30, Nov. 9, 2018 |

In some embodiments, the electronic device 101 (for example, the mobile phone 101) may perform voice communication, for example, a VoIP call, with the electronic device 107 (for example, the mobile phone 107) through the network 109. A second account (for example, HUAWI-02 in Table 1) may be used to log in to the device management server 103 on the electronic device 107.

In some embodiments, the voice switchover system 100 may further include a voice assistant server 105. The voice assistant server 105 may communicate with an external service (for example, a streaming media service, a navigation service, a calendar service, a phone service, or a photo service) through the network 109, to complete a task or collect information. The voice assistant server 105 may be a part of a voice assistant system (which is not shown in the figure), and the voice assistant system may be implemented based on a client-server model. For example, the voice assistant system may include a client side part (for example, a voice assistant client) implemented on an electronic device (for example, the electronic device 102 in FIG. 1) and a server side part (for example, the voice assistant system) implemented on the voice assistant server 105. The voice assistant client may communicate with the voice assistant system through the network 109. The voice assistant client provides functions on a client side, such as user-oriented input and output processing and communication with the voice assistant system on a server side. The voice assistant system may provide a server side function for one or more voice assistant clients, and the one or more voice assistant clients are located on a corresponding electronic device or corresponding electronic devices (for example, the electronic device 101 and the electronic device 102).

For example, the first electronic device (for example, the electronic device 101) shown in FIG. 1 may be the mobile phone 101, and the second electronic device (for example, the electronic device 102) may be a voice assistant device such as the smart speaker 102.

In some embodiments, the mobile phone 101 and the smart speaker 102 each may have a voice communication function. For example, the mobile phone 101 and the smart speaker 102 may provide a VoIP service. In this case, as shown in FIG. 1, the voice switchover system 100 may further include a VoIP server 104. The VoIP server 104 may be configured to implement voice communication-related services such as calling, answering, a three-party call, and call transfer of the VoIP service. In this way, the mobile phone 101 (or the smart speaker 102) may perform, through the VoIP server 104, voice communication with another electronic device having a voice communication function.

In some embodiments, the voice assistant server 105 may provide a voice recognition result for the VoIP server 104. For example, after the user 108 inputs a voice signal "Call John" to the smart speaker 102, the smart speaker 102 may send the collected voice signal to the voice assistant server 105 for voice recognition. The voice assistant server 105 recognizes that a control instruction corresponding to the voice signal is: calling the contact John. Further, the voice assistant server 105 may send, to the VoIP server 104, the instruction for calling the contact John. In response to the instruction, the VoIP server 104 may initiate a voice call request to an electronic device (for example, a mobile phone) of John. After accepting the voice call request, John can establish a voice call between the smart speaker 102 and the mobile phone of John, to implement a VoIP service.

In some other embodiments, as shown in FIG. 1, the voice switchover system 100 may further include a content server 106. The content server 106 may be configured to provide streaming media content such as music and a video for the smart speaker 102 (or the mobile phone 101) according to requests of the user 108. For example, after the user 108 sends a voice signal of "playing the song Silence" to the smart speaker 102, the smart speaker 102 may send the collected voice signal to the voice assistant server 105 through the network 109 for voice recognition. The voice assistant server 105 recognizes that a control instruction corresponding to the voice signal is: obtaining a media resource of the song Silence. Further, the voice assistant server 105 may send request information to the content server 106 to obtain the media resource of the song Silence. In response to the request information sent by the voice assistant server 105, after finding the media resource of the song Silence, the content server 106 may return the playing address to the voice assistant server 105, and the voice assistant server 105 sends the media resource to the smart speaker 102, so that the smart speaker 102 obtains an address of the song Silence based on the media resource, and plays or stores the song Silence.

Certainly, the mobile phone 101 (or the smart speaker 102) may alternatively directly interact with the content server 106 through the network 109. For example, the mobile phone 101 (or the smart speaker 102) may send, to the content server 106 based on an input of the user 108, request information for playing the song Silence. After receiving the request information, the content server 106 finds a media resource of the song Silence, and then may return the media resource to the mobile phone 101 (or the smart speaker 102). The mobile phone 101 (or the smart speaker 102) obtains an address of the song Silence based on the received media resource and plays the song, or may store the song in a memory of the mobile phone 101 or a memory of the smart speaker 102.

In some other embodiments, after a same account is used for login on the mobile phone 101 and the smart speaker 102, when the mobile phone 101 executes a voice call service (for example, the foregoing VoIP service), if the user 108 expects to switch the voice call service to the smart speaker 102, the user 108 may perform a preset specific operation, such as a specific gesture or a voice input, on the mobile phone 101 or the smart speaker 102, to trigger the VoIP server 104 to switch, to the smart speaker 102, the voice call service that is being performed on the mobile phone 101. In this way, the voice call service continues being performed on the smart speaker 102. Correspondingly, when a voice call is ongoing on the smart speaker 102, the user 108 may also perform a preset specific operation on the mobile phone 101 or the smart speaker 102, to trigger the VoIP server 104 to switch, to the mobile phone 101, the voice call service that is being performed on the smart speaker 102. In this way, the voice call service continues being performed on the mobile phone 101. In other words, in the foregoing embodiment, the VoIP server 104 can automatically switch an ongoing voice call service from the first electronic device to the second electronic device, provided that the user 108 performs the foregoing specific operation on the electronic device. In this way, voice call service interruption does not occur in the entire switchover process, and the user does not need to repeatedly perform an operation between a plurality of electronic devices, thereby increasing efficiency of voice switchover between a plurality of electronic devices and improving user experience.

In some other embodiments, after a same account (for example, HUAWEI-01) is used for login on the mobile phone 101 and the smart speaker 102, when the mobile phone 101 is playing audio/a video, if the user 108 expects to switch (for example, seamlessly switch), to the smart speaker 102 for continuing playing, the audio/video that is being played, the user 108 may perform a preset input operation on the mobile phone 101 or the smart speaker 102, to trigger the content server 106 to switch, to the smart speaker 102 for continuing playing, an audio service/a video service that is being played on the mobile phone 101. Similarly, when the smart speaker 102 executes an audio service/a video service, the user 108 may also perform a preset input operation on the mobile phone 101 or the smart speaker 102, to trigger the content server 106 to switch, to the mobile phone 101 for continuing playing, the audio/video that is being played on the smart speaker 102.

It should be noted that, in addition to being the mobile phone 101, the first electronic device may alternatively be an electronic device that supports an audio service/a video service or a voice call service, such as a tablet computer, a wearable electronic device (such as a smartwatch) having a wireless communication function, or a virtual reality device. A specific form of the first electronic device is not specially limited in the following embodiments. In addition to being the smart speaker 102, the second electronic device may alternatively be an electronic device that supports an audio service/a video service, such as a smart television, a tablet computer, a notebook computer, or a desktop computer. A specific form of the second electronic device is not specially limited in the following embodiments. In some embodiments, the first electronic device may be a mobile phone, and the second electronic device may be a smart speaker or a notebook computer provided with a voice assistant system.

Figure 2:
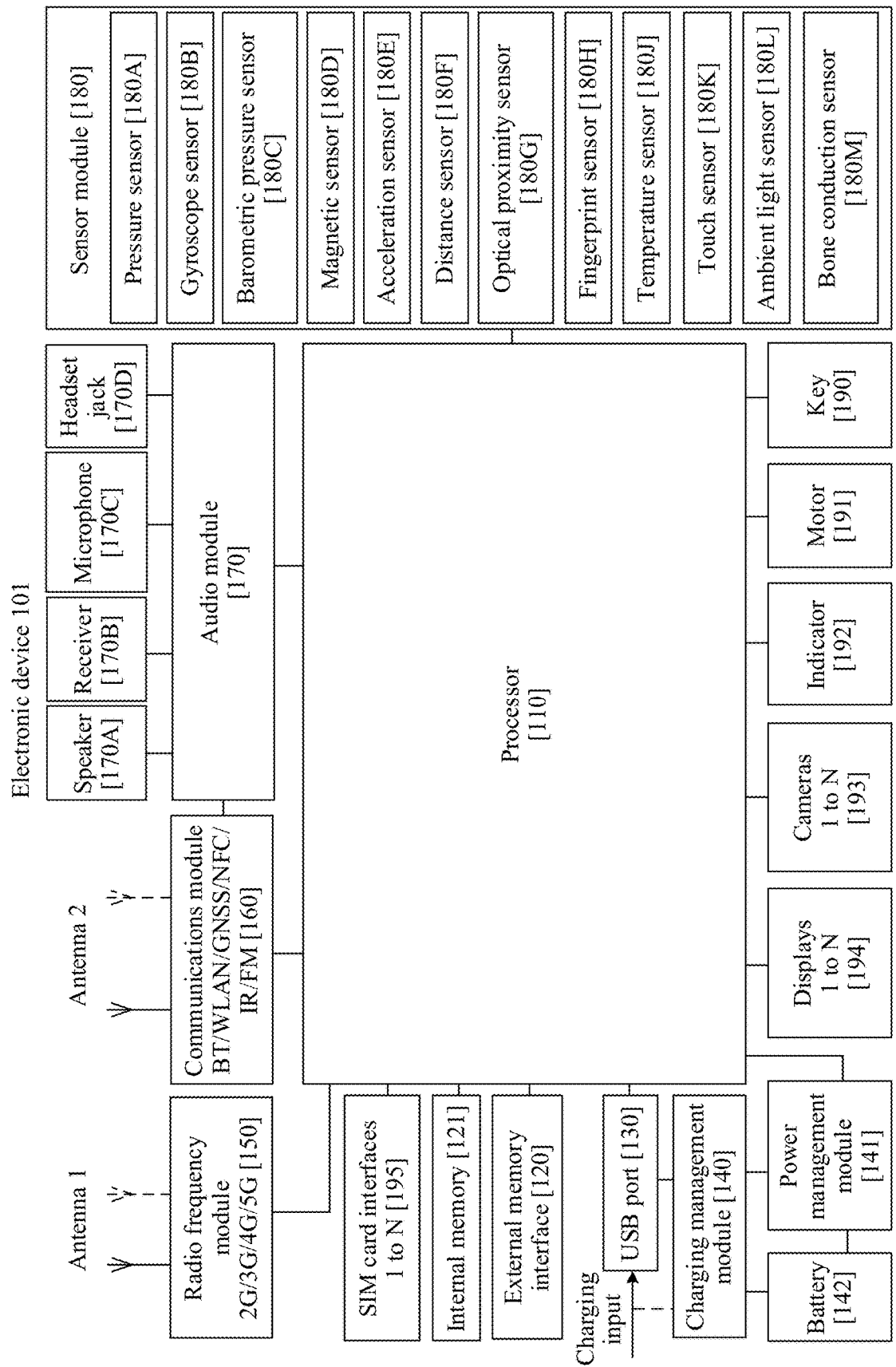
FIG. 2 is a schematic structural diagram of a first electronic device (such as a mobile phone) according to an embodiment.

For example, FIG. 2 is a schematic structural diagram of a first electronic device, namely, the electronic device 101 (for example, a mobile phone) in FIG. 1.

The electronic device 101 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a key 190, a motor 191, an indicator 192, a camera 193, a display 194, a subscriber identity module (SIM) card interface 195, and the like. It may be understood that a structure shown in this embodiment does not constitute a specific limitation to the electronic device 101. In some other embodiments of this application, the electronic device 101 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors. In some embodiments, the electronic device 101 may alternatively include one or more processors 110. The controller may be a nerve center and a command center of the electronic device 101. The controller may generate an operation control signal based on instruction operation code and a time sequence signal, to complete control of instruction reading and instruction execution. A memory may be further disposed in the processor 110, and is configured to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory. In this way, repeated access is avoided, and a waiting time of the processor 110 is reduced, thereby increasing efficiency of a system of the electronic device 101.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The USB port 130 is an interface that conforms to a USB standard specification, and may be specifically a mini USB port, a micro USB port, a USB Type C interface, or the like. The USB port 130 may be configured to connect to a charger to charge the electronic device 101, or may be configured to perform data transmission between the electronic device 101 and a peripheral device, or may be configured to connect to a headset to play audio by using the headset.

It may be understood that an interface connection relationship between the modules that is shown in this embodiment of the present invention is merely an example for description, but does not constitute a limitation to the structure of the electronic device 101. In some other embodiments of this application, the electronic device 101 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB port 130. In some embodiments of wireless charging, the charging management module 140 may receive a wireless charging input through a wireless charging coil of the electronic device 101. When charging the battery 142, the charging management module 140 may further supply power to the electronic device 101 through the power management module 141.

The power management module 141 is configured to connect the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 101 may be implemented by the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the electronic device 101 may be configured to cover a single communications frequency band or a plurality of communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 can provide a wireless communication solution that is applied to the electronic device 101 and that includes 2G, 3G, 4G, 5G, and the like. The mobile communications module 150 may include at least one filter, a switch, a power amplifier, a low noise amplifier, and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then is transferred to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that is applied to the electronic device 101 and that includes a wireless local area network (WLAN) (for example, a Wi-Fi network), Bluetooth (BT), a global navigation satellite system (GNSS), frequency modulation (FM), a near field communication technology (NFC), and an infrared technology (IR). The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The wireless communications module 160 may be specifically configured to establish a short-distance wireless communication link to a second electronic device (for example, the electronic device 102), so that short-distance wireless data transmission is performed between the wireless communications module 160 and the second electronic device. For example, the short-distance wireless communication link may be a Bluetooth communication link, a Wi-Fi communication link, an NFC communication link, or the like. Therefore, the wireless communications module 160 may specifically include a Bluetooth communications module, a Wi-Fi communications module, or an NFC communications module.

In some embodiments, the antenna 1 and the mobile communications module 150 of the electronic device 101 are coupled, and the antenna 2 and the wireless communications module 160 of the electronic device 101 are coupled, so that the electronic device 101 can communicate with a network and another device by using a wireless communications technology. The wireless communications technology may include a GSM, a GPRS, CDMA, WCDMA, TD-SCDMA, LTE, GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The electronic device 101 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and the one or more GPUs execute an instruction to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 101 may include one or N displays 194, where N is a positive integer greater than 1.

The electronic device 101 may implement a photographing function through the ISP, one or more cameras 193, the video codec, the GPU, one or more displays 194, the application processor AP, and the like.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 101, for example, image recognition, facial recognition, voice recognition, and text understanding, may be implemented through the NPU.

The external memory interface 120 may be configured to connect to an external memory card, for example, a micro SD card, to extend a storage capability of the electronic device 101. The external memory card communicates with the processor 110 through the external memory interface 120, to implement a data storage function. For example, data such as music, a photo, and a video is stored in the external memory card.

The internal memory 121 may be configured to store one or more computer programs, where the one or more computer programs include an instruction. The processor 110 may run the foregoing instruction stored in the internal memory 121, so that the electronic device 101 performs a voice switchover method provided in some embodiments of this application, various function applications, data processing, and the like. The internal memory 121 may include a program storage area and a data storage area. The program storage area may store an operating system. The program storage area may further store one or more applications (for example, a gallery or a contact). The data storage area may store data (for example, a picture or a contact) created in a process of using the electronic device 101. In addition, the internal memory 121 may include a high-speed random access memory, and may alternatively include a nonvolatile memory, for example, at least one disk storage device, a flash memory device, or a universal flash storage (UFS). In some embodiments, the processor 110 may run the instruction stored in the internal memory 121 and/or an instruction stored in the memory disposed in the processor 110, so that the electronic device 101 performs a voice switchover method provided in the embodiments of this application, various function applications, and data processing.

The electronic device 101 can implement an audio function such as music playing or recording through the audio module 170, the speaker 170A, the receiver 170B, the microphone 170C, the headset jack 170D, the application processor, and the like. The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110. The speaker 170A, also referred to as a "loudspeaker", is configured to convert an audio electrical signal into a sound signal. The electronic device 101 may be used to listen to music or answer a call in a hands-free mode through the speaker 170A. The receiver 170B, also referred to as an "earpiece", is configured to convert an audio electrical signal into a sound signal. When a call is answered or audio information is listened to through the electronic device 101, the receiver 170B may be put close to a human ear to listen to a voice. The microphone 170C, also referred to as a "mic" or a "mike", is configured to convert a sound signal into an electrical signal. When making a call or sending a voice message, a user may make a sound by putting the mouth of the user near the microphone 170C, to input a sound signal to the microphone 170C. At least one microphone 170C may be disposed in the electronic device 101. In some other embodiments, two microphones 170C may be disposed in the electronic device 101, to collect a sound signal and implement a noise reduction function. In some other embodiments, three, four, or more microphones 170C may alternatively be disposed in the electronic device 101, to collect a sound signal, implement noise reduction, recognize a sound source, implement a directional recording function, and the like. The headset jack 170D is configured to connect to a wired headset. The headset jack 170D may be a USB port 130, or may be a 3.5 mm open mobile terminal platform (OMTP) standard interface or a cellular telecommunications industry association of the USA (CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed in the display 194. There are many types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device 101 determines pressure strength based on a change of the capacitance. When a touch operation is performed on the display 194, the electronic device 101 detects strength of the touch operation through the pressure sensor 180A. The electronic device 101 may also calculate a touch position based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating a new SMS message is executed.

The gyro sensor 180B may be configured to determine a moving posture of the electronic device 101. In some embodiments, an angular velocity of the electronic device 101 around three axes (namely, axes x, y, and z) may be determined through the gyro sensor 180B. The gyro sensor 180B may be configured to implement image stabilization during photographing. For example, when a shutter is pressed, the gyro sensor 180B detects an angle at which the electronic device 101 shakes, calculates, based on the angle, a distance for which a lens module needs to compensate, and allows the lens to cancel the shake of the electronic device 101 through reverse motion, to implement image stabilization. The gyro sensor 180B may also be used in a navigation scenario, a somatic game scenario, and the like.

The acceleration sensor 180E may detect magnitude of accelerations in various directions (usually on three axes) of the electronic device 101, and may detect magnitude and a direction of the gravity when the electronic device 101 is static. The acceleration sensor 180E may be further configured to recognize a posture of the electronic device, and is applied to an application such as switchover between a landscape mode and a portrait mode or a pedometer.

The distance sensor 180F is configured to measure a distance. The electronic device 101 may measure the distance in an infrared manner or a laser manner. In some embodiments, in a photographing scenario, the electronic device 101 may measure a distance through the distance sensor 180F to implement quick focusing.

The optical proximity sensor 180G may include, for example, a light emitting diode (LED) and an optical detector, for example, a photodiode. The light-emitting diode may be an infrared light-emitting diode. The electronic device 101 emits infrared light through the light emitting diode. The electronic device 101 detects infrared reflected light from a nearby object by using the photodiode. When sufficient reflected light is detected, the electronic device 101 may determine that there is an object near the electronic device 101. When insufficient reflected light is detected, the electronic device 101 may determine that there is no object near the electronic device 101. The electronic device 101 may detect, by using the optical proximity sensor 180G, that the user holds the electronic device 101 close to an ear to make a call, so that the electronic device 101 automatically turns off a screen to save power. The optical proximity sensor 180G may be further configured to automatically lock and unlock the screen in a smart cover mode or a pocket mode.

The ambient light sensor 180L is configured to sense ambient light brightness. The electronic device 101 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 101 is in a pocket, to avoid an accidental touch.

The fingerprint sensor 180H (which is also referred to as a fingerprint recognizer) is configured to collect a fingerprint. The electronic device 101 may use a feature of the collected fingerprint to implement fingerprint-based unlocking, application lock access, fingerprint-based photographing, fingerprint-based call answering, and the like. In addition, for other descriptions about the fingerprint sensor, refer to the international patent application PCT/CN2017/082773 entitled "NOTIFICATION PROCESSING METHOD AND ELECTRONIC DEVICE", which is incorporated herein by reference in its entirety.

The touch sensor 180K may also be referred to as a touch panel or a touch-sensitive surface. The touch sensor 180K may be disposed in the display 194, and the touch sensor 180K and the display 194 constitute a touchscreen. The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may also be disposed on a surface of the electronic device 101 and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further contact a body pulse to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 101 may receive a key input, and generate a key signal input related to a user setting and function control of the electronic device 101.

The SIM card interface 195 is configured to connect to a SIM card. The SIM card may be inserted into the SIM card interface 195 or removed from the SIM card interface 195, to implement contact with or separation from the electronic device 101. The electronic device 101 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 simultaneously. The plurality of cards may have a same type or different types. The SIM card interface 195 may be compatible with different types of SIM cards. The SIM card interface 195 may also be compatible with an external memory card. The electronic device 101 interacts with a network through the SIM card, to implement a call function, a data communication function, and the like. In some embodiments, the electronic device 101 uses an eSIM, namely, an embedded SIM card. The eSIM card may be embedded into the electronic device 101, and cannot be separated from the electronic device 101.

The structure of the second electronic device is described in detail in the following embodiment. It should be understood that in some embodiments, the structure of the second electronic device may be the same as that of the first electronic device (for example, the electronic device 101 in FIG. 2). Therefore, the structure of the second electronic device is not described herein again. In some other embodiments, the second electronic device (for example, the electronic device 102) may be a voice assistant device. Therefore, the structure of the second electronic device may alternatively be different from that of the first electronic device. For example, FIG. 3 is a schematic structural diagram of a second electronic device in some other embodiments.

Figure 3:
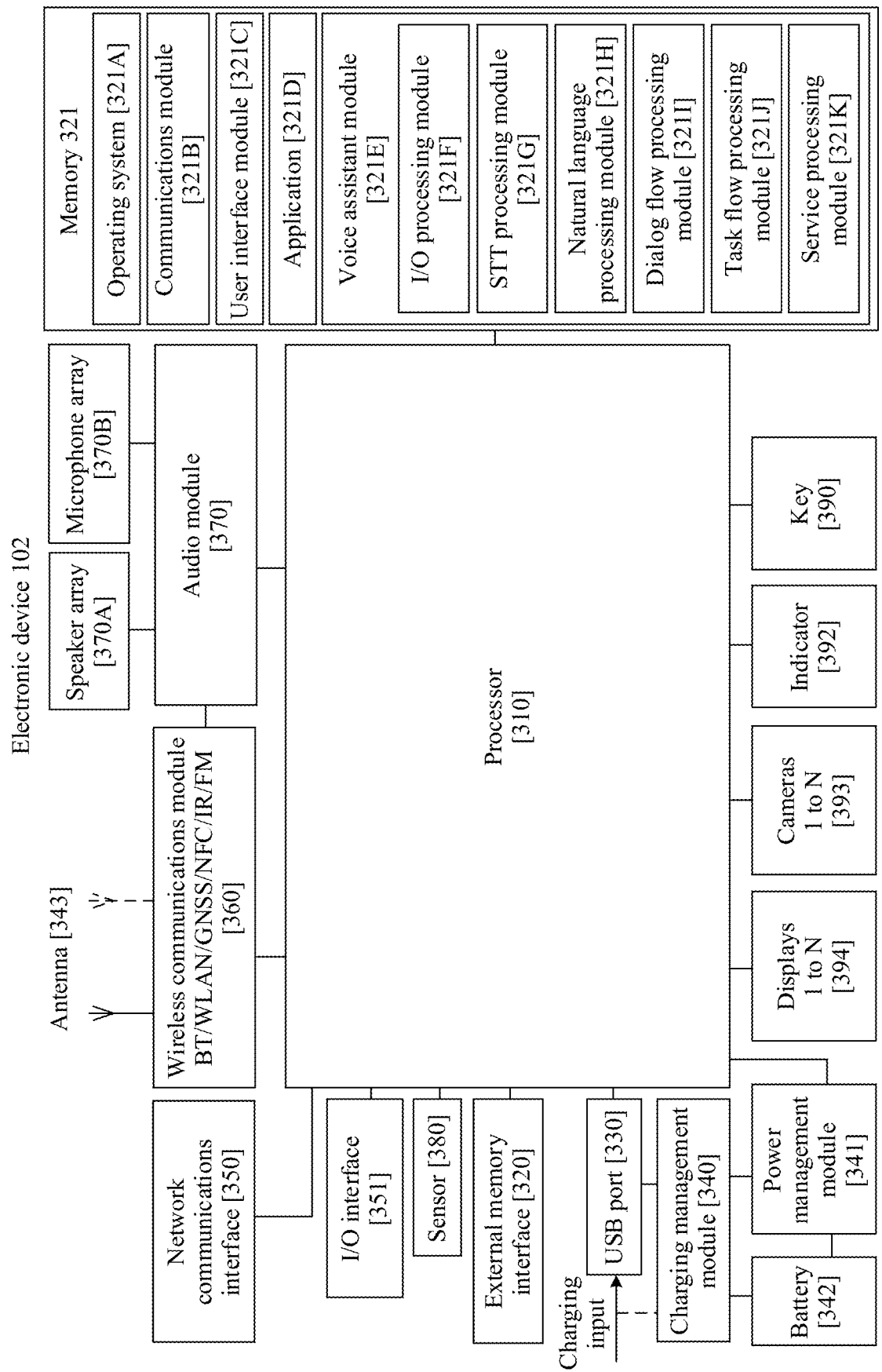
FIG. 3 is a schematic structural diagram of a second electronic device (such as a smart speaker) according to an embodiment.

FIG. 3 is a schematic structural diagram of a second electronic device (for example, the electronic device 102) in some embodiments. For example, the electronic device 102 may be specifically a voice assistant device (for example, a smart speaker 102), and the voice assistant device is provided with a voice assistant system.

For example, the voice assistant system may be any information processing system that interprets a natural language input in an oral form and/or a text form to infer a user intent (for example, recognizing a task type corresponding to the natural language input) and performs an action based on the inferred user intent (for example, executes a task corresponding to the recognized task type). For example, to perform actions based on the inferred user intent, the system may perform one or more of the following operations: recognizing a task flow (for example, recognizing a task type) by designing steps and parameters to implement the inferred user intent; inputting a specific requirement from the inferred user intent into the task flow; executing the task flow (for example, sending a request to a service provider) by invoking a program, a method, a service, an application programming interface (application programming interface, API), and the like; and generating an output response in an auditory (for example, a voice) and/or visual form to the user. Specifically, once the voice assistant system is started, at least some user requests in a form of a natural language command, a request, a declaration, a narration, and/or a query can be accepted. A user usually requests the voice assistant system to make an informational answer, or requests the voice assistant system to execute a task. A satisfactory response to a user request is usually to provide a requested informational answer, execute a requested task, or implement a combination of both. For example, the user may ask the voice assistant system a question such as "Where am I now?". Depending on a current location of the user, the voice assistant may reply "You are near the west gate of Central Park." The user may further request to execute a task, for example, by saying "Please invite my friends to my birthday party next week." As a response, the voice assistant system may acknowledge the request by generating a voice output "OK, I'll do that right now" and then send an appropriate calendar invitation from the user's e-mail address to each of the user's friends listed in the user's electronic address book or contact list. In some embodiments, there are many other methods for interacting with the voice assistant system to request information or execute various tasks. In addition to providing an oral response and performing a programmatic action, the voice assistant system may further provide other responses in a visual form or an audio form (for example, a text, an alarm, music, a video, and an animation).

As shown in FIG. 3, the electronic device 102 may specifically include a processor 310, an external memory interface 320, a memory 321, a USB port 330, a charging management module 340, a power management module 341, a battery 342, an antenna 343, a network communications interface 350, and an input/output (I/O) interface 351, a wireless communications module 360, an audio module 370, one or more speaker arrays 370A, one or more microphone arrays 370B, one or more sensors 380, a key 390, a motor 391, an indicator 392, a camera 393, a display 394, and the like. These components communicate with each other through one or more communications buses or signal cables.

It may be understood that a structure shown in this embodiment does not constitute a specific limitation to the electronic device 102. In some other embodiments of this application, the electronic device 102 may include more or fewer components than those shown in the figure, combine some components, split some components, or have different component arrangements. The components shown in the figure may be implemented by hardware, software, or a combination of software and hardware.

In some embodiments, the external memory interface 320, the USB port 330, the charging management module 340, the power management module 341, the battery 342, the antenna 343, the wireless communications module 360, the audio module 370, the one or more sensors 380, the key 390, the motor 391, the indicator 392, the camera 393, the display 394, and the like in FIG. 3 may have a same structure and/or function as or have structures and/or functions similar to some components of the electronic device 101 in FIG. 2. Therefore, for specific descriptions of the foregoing components in FIG. 3, refer to corresponding descriptions in FIG. 2 and the related embodiment. Details are not described herein again.

The network communications interface 350 may include one or more wired communications ports, or one or more wireless transmit/receive circuits. The one or more wired communications ports receive and send a communications signal through one or more wired interfaces (for example, the Ethernet, a USB, and/or a firewire). A radio circuit usually receives an RF signal or an optical signal from a communications network and another electronic device, and sends an RF signal or an optical signal to the communications network and the another electronic device. Wireless communications may use any one of a plurality of communications standards, protocols, and technologies, such as GSM, CDMA, WCDMA, TDMA, Bluetooth, Wi-Fi, VoIP, or any other suitable communications protocol. The network communications interface 350 enables the electronic device 102 to communicate with another electronic device (for example, a mobile phone 101) or a server on a network side through a network such as the internet, or a wireless network such as a cellular network or a wireless local area network.

The memory 321 may include a high-speed random access memory, and may alternatively include a nonvolatile memory, for example, at least one disk storage device, a flash memory device, or a universal flash storage. In some embodiments, the processor 310 may run an instruction stored in the memory 321 or an instruction stored in a memory disposed in the processor 310, so that the electronic device 102 performs a voice switchover method provided in the embodiments of this application, various function applications, and data processing.

In some embodiments, the memory 321 may store a program, a module, an instruction, and a data structure. The program, the module, the instruction, and the data structure include all or a subset of the following: an operating system 321A, a communications module 321B, a user interface module 321C, and one or more applications 321D, and a voice assistant module 321E. The one or more processors 310 execute the program, the module, and the instruction, and read data from the data structure or write data into the data structure.

The operating system 321A (for example, Darwin, RTXC, LINUX, UNIX, OS X, WINDOWS, or an embedded operating system) includes various software components or drivers configured to control and manage general system tasks (for example, memory management, storage device control, and power management), and facilitates communication between various hardware, firmware, and the software components. The communications module 321B facilitates communication between the voice assistant device 300 and another electronic device through the network communications interface 350. For example, the communications module 321B may communicate with the electronic device 101 shown in FIG. 2. The communications module 321B may further include various software components, and the various software components may be configured to process data received through the network communications interface 350. The user interface module 321C receives a command or an input from a user through the I/O interface 351 (for example, from a keyboard, a touchscreen, or a microphone that is connected to the I/O interface 351), and displays a user interface on the display. The application 321D includes a program or a module configured to be executed by the one or more processors 310. For example, if a voice assistant system is independently implemented on the voice assistant device, the application 321D may include an application such as a game application, a calendar application, a navigation application, or a mail application. If the voice assistant system is implemented on a server, the application 321D may include an application such as a resource management, diagnosis, or scheduling application.

The memory 321 further stores the voice assistant module 321E. In some specific embodiments, the voice assistant module 321E may include the following submodules, or a subset or superset of the following submodules: an I/O processing module 321F, a speech-to-text (STT) processing module 321G, a natural language processing module 321H, a dialog flow processing module 321I, a task flow processing module 321J, and a service processing module 321K. The voice assistant module 321E is mainly configured to implement the voice assistant system in this embodiment of this application through information exchange between the foregoing submodules.

In some embodiments, by using a processing module (for example, the I/O processing module 321F, the STT processing module 321G, the natural language processing module 321H, the dialog flow processing module 321I, a task flow processing module 321J, or the service processing module 321K), data, and a model implemented in the voice assistant module 321E, the voice assistant device 300 may perform at least one of the following operations: recognizing a user's intention expressed in a natural language input received from the user; proactively directing toward and obtaining information required for fully inferring the user's intention (for example, by eliminating ambiguity of a word, a name, an intention, or the like); determining a task flow used to implement the inferred intention; and executing the task flow to implement the inferred intention. In some other embodiments, the voice assistant device 300 also takes other appropriate actions when a satisfactory response is not provided or cannot be provided for the user due to various reasons.

In some embodiments, the I/O processing module 321F may receive a command (for example, a voice command) or an input (for example, a voice input) of the user by using the one or more microphone arrays 370B; or the I/O processing module 321F may receive, through the I/O interface 351, a command or an input of the user from another connected device (for example, a microphone, a touchscreen, or a keyboard). The I/O processing module 321F may further provide a response to the user input through the one or more speaker arrays 370A, the indicator 392, the display 394, or the like, so as to interact with the user; or the I/O processing module 321F may interact with another electronic device (for example, the electronic device 101 in FIG. 2) through the network communications interface 350, to obtain a user input (for example, a voice input) and provide a response to the user input. The I/O processing module 321F may obtain context information associated with the user input from the another electronic device, when or shortly after receiving the user input. The context information includes user-specific data, a user-specific vocabulary, or a preference associated with the user input. In some other embodiments, the context information may further include software and hardware statuses of the electronic device (for example, the electronic device 101) that are present when a user request is received, or information related to a surrounding environment of the user when a user request is received. In some embodiments, the I/O processing module 321F further sends a follow-up question related to the user request to the user, and receives a reply from the user. In some embodiments, when the user request is received by the I/O processing module 321F and the user request includes a voice input, the I/O processing module 321F may forward the voice input to the STT processing module 321G to perform voice-to-text conversion.

In some embodiments, the STT processing module 321G receives a voice input through the I/O processing module 321F. The STT processing module 321G may use various sound models and language models to recognize the voice input as a phoneme sequence, and finally recognize the phoneme sequence as a sequence of words (words) or tokens (tokens) written in one or more languages. The STT processing module 321G may implement the embodiments of this application by using any suitable voice recognition technology, sound model, and language model, such as a hidden Markov model, voice recognition based on dynamic time warping, and another statistics or analysis technology. In some embodiments, at least a part of voice-to-text processing may be performed by a third-party service or on the electronic device. Once the STT processing module 321G obtains a result of voice-to-text processing (for example, a sequence of words or tokens), the STT processing module 321G transmits the result to the natural language processing module 321H for intent inference.

The natural language processing module 321H (which may also be referred to as a natural language processor) obtains the sequence of words or tokens ("token sequence") generated by the STT processing module 321G, and attempts to associate the token sequence with one or more "actionable intents" recognized by the voice assistant module 321E. The "actionable intent" represents a task that can be executed by the voice assistant module 321E, and has an associated task flow implemented in a task flow model. The associated task flow is a series of programmed actions and steps performed by the voice assistant module 321E to execute a task. A capability range of the voice assistant system depends on a quantity and types of task flows that have been implemented and stored in the task flow model, in other words, depends on a quantity and types of "actionable intents" recognized by the voice assistant module 321E. However, effectiveness of the voice assistant system 300 also depends on a capability for the voice assistant module 321E to infer correct "one or more actionable intents" from a user request expressed in a natural language.

In some embodiments, in addition to obtaining the sequence of words or tokens from the STT processing module 321G, the natural language processing module 321H may also receive context information (for example, from the I/O processing module 321F) associated with the user request. The natural language processing module 321H may also use context information to clarify, supplement, and/or further define information included in the token sequence received from the STT processing module 321G. The context information includes, for example, a user preference, a hardware and/or software status of user equipment, sensor information collected before, during, or shortly after a user request, and previous interaction (for example, a conversation) between the voice assistant system and the user.

In some embodiments, the natural language processing module 321H may specifically include a knowledge ontology, a vocabulary, user data, and a classification module. The knowledge ontology is a hierarchical structure including a plurality of nodes, and each node represents an "actionable intention" or "attribute" related to one or more of "actionable intentions" or other "attributes". As described above, the "actionable intent" represents a task (for example, a task that can be executed or can be performed) that can be executed by the voice assistant system 300. The "attribute" represents a parameter associated with a sub-aspect of an actionable intent or another attribute. Each node in the knowledge ontology is associated with a set of words and/or phrases related to an attribute or an actionable intent represented by the node. Corresponding words and/or phrases associated with each node are so-called "vocabularies" associated with the node. A corresponding set of words and/or phrases associated with each node may be stored in a vocabulary index associated with an attribute or an actionable intent that is represented by the node. The vocabulary index may include words and phrases in different languages. In some embodiments, the natural language processor 321H receives a token sequence (for example, a text string) from the STT processing module 321G, and determines specific nodes related to words in the token sequence.

The user data includes user-specific information such as a user-specific vocabulary, a user preference, a user address, a default language and a second language of a user, a contact list of the user, and other short-term or long-term information of each user. The natural language processor 321H may use the user data to supplement information included in the user input to further define the user intention. For example, in response to a user request "Invite my friends to my birthday party", the natural language processor 321H can access the user data to determine specific "friends", and when and where the "birthday party" is to take place, and a user does not need to explicitly provide such information in the user request.

The natural language processor 321H may further include the classification module. In some embodiments, the classification module determines, for example, whether each of one or more words in a text string is one of an entity, an activity, or a location. Once an actionable intent is recognized based on a user request, the natural language processor 321H generates a structured query to represent the recognized actionable intent. In some embodiments, the natural language processor 321H can fill in some parameters of the structured query with received context information. For example, if a user requests a sushi store "near me", the natural language processor 321H can fill in a location parameter in the structured query with GPS coordinates from the voice assistant device 300.

In some embodiments, the natural language processor 321H transfers the structured query to the task flow processing module 321J (which may also be referred to as a task flow processor). The task flow processor 321J is configured to perform one or more of the following steps: receiving the structured query from the natural language processor 321H, completing the structured query, and executing an action required for a final request of a user. In some embodiments, various processes required for completing these tasks are provided in the task flow model in the task flow processing module 321J. The task flow model includes a process for obtaining additional information from a user, and a task flow for performing an action associated with an actionable intent. As mentioned above, to complete the structured query, the task flow processor 321J may need to initiate an additional dialog with the user, to obtain additional information and/or eliminate ambiguity of possible ambiguous discourse. When such interaction is necessary, the task flow processor 321J invokes the dialog processing module 321I (which may also be referred to as a dialog processor) to make a dialog with the user. In some embodiments, the dialog processing module 321I determines how (and/or when) to ask the user for additional information, and receives and processes a response from the user. In some embodiments, the I/O processing module 351 provides a question for the user and receives an answer from the user. For example, the dialog processing module 321I presents a dialog output to the user through the loudspeaker array 370A and/or the display 394, and receives an input from the user.

In some embodiments, the dialog processor 321I may include a disambiguation module. The disambiguation module is configured to eliminate ambiguity of one or more fuzzy words (for example, one or more fuzzy words in a text string of a voice output associated with a digital photo). In some embodiments, the disambiguation module recognizes that a first word in the one or more words has a plurality of candidate meanings, prompts the user with additional information about the first word, responds to the prompted additional information received from the user, and recognizes, based on the additional information, an entity, an activity, or a location associated with the first word.

Once the task flow processor 321J has completed the structured query for the actionable intent, the task flow processor 321J continues to perform a final task associated with the actionable intent. Therefore, the task flow processor 321J may execute steps and instructions in the task flow model based on specific parameters included in the structured query. In some embodiments, the task flow processor 321J completes, with assistance of the service processing module 321K (which may also be referred to as a service processor), a task requested in the user input, or provides an informational answer requested in the user input. For example, the service processor 321K may replace the task flow processor 321J to initiate a phone call, set a calendar entry, invoke a map search, invoke or interact with other applications installed on user equipment, and invoke or interact with third-party services (for example, restaurant reservation portals, social networking sites or services, or bank portals). In some embodiments, a protocol and an application programming interface (API) that are required for each service may be specified by a corresponding service model in a service model in the service processing module 321K. The service processor 321K accesses an appropriate service model for a service, and generates a request for the service according to a protocol and an API that are required by the service model based on the service.

In some embodiments, the natural language processor 321H, the dialog processor 321K, and the task flow processor 321J are jointly and repeatedly used, to infer and define a user intention, obtain information to further clarify and extract the user intention, and finally generate a response (for example, an output is provided to the user or the task is completed) to satisfy the user intention. In some embodiments, after all tasks required for the user request have been executed, the voice assistant system formulates an acknowledgment response, and sends the response to the user by using the I/O processing module 321F. If an informational answer is requested for the user request, the acknowledgment response presents requested information to the user.

In some other embodiments, the I/O interface 351 may couple an I/O device such as a keyboard, a touchscreen, or a microphone of the voice assistant device 300 to the user interface module 321C. The I/O interface 351 is combined with the user interface module 321C to receive user inputs (for example, a voice input, a keyboard input, and a touch input) and process the inputs accordingly.

It may be understood that the second electronic device may be distributed across a plurality of computers, to constitute a client-server voice assistant system. Some modules and functions of the voice assistant system are classified into a server part and a client part. The client part may be located on the second electronic device (for example, the electronic device 102), and communicate with the server part (for example, the voice assistant server 105) through the network 109, as shown in FIG. 1. In some embodiments, the voice assistant system may be an embodiment of the voice assistant server 105 shown in FIG. 1. In some other embodiments, the voice assistant system may be implemented in the electronic device 102, thereby eliminating a requirement for a client-server system. It should be noted that the voice assistant system is merely an example, and the voice assistant system may have more or fewer components than shown components, may combine two or more components, or may have different configurations or layouts of components.

With reference to the accompanying drawings, the following describes in detail the voice switchover method provided in the embodiments of this application by using a mobile phone 101 as a first electronic device and using a smart speaker 102 as a second electronic device.

For example, a VoIP service is used as an example. In this embodiment of this application, the ongoing VoIP service may be switched between the mobile phone 101 and the smart speaker 102. An electronic device on which a VoIP service is ongoing before the switchover may be referred to as a source device for the VoIP service, and the source device may be the mobile phone 101, or may be the smart speaker 102. A device that continues performing the VoIP service after the switchover may be referred to as a target device for the VoIP service. When the source device is the mobile phone 101, the target device for the VoIP service may be the smart speaker 102. When the source device is the smart speaker 102, the target device for the VoIP service may be the mobile phone 101.

The following describes how to switch a VoIP service between the mobile phone 101 and the smart speaker 102 with reference to specific scenarios of the embodiments.

In some application scenarios, after a user 108 logs in to a device management server 103 on the mobile phone 101 and the smart speaker 102 by using a same account, the user 10 may perform a VoIP service with another electronic device (for example, the electronic device 107 in FIG. 1) by using the smart speaker 102. If the user 108 expects to switch the VoIP service from the smart speaker 102 to the mobile phone 101, the user may perform a preset input operation on the mobile phone 101, to trigger a VoIP server 104 to switch the VoIP service ongoing on the smart speaker 102 to the mobile phone 101 through a network 109.

Figure 4:
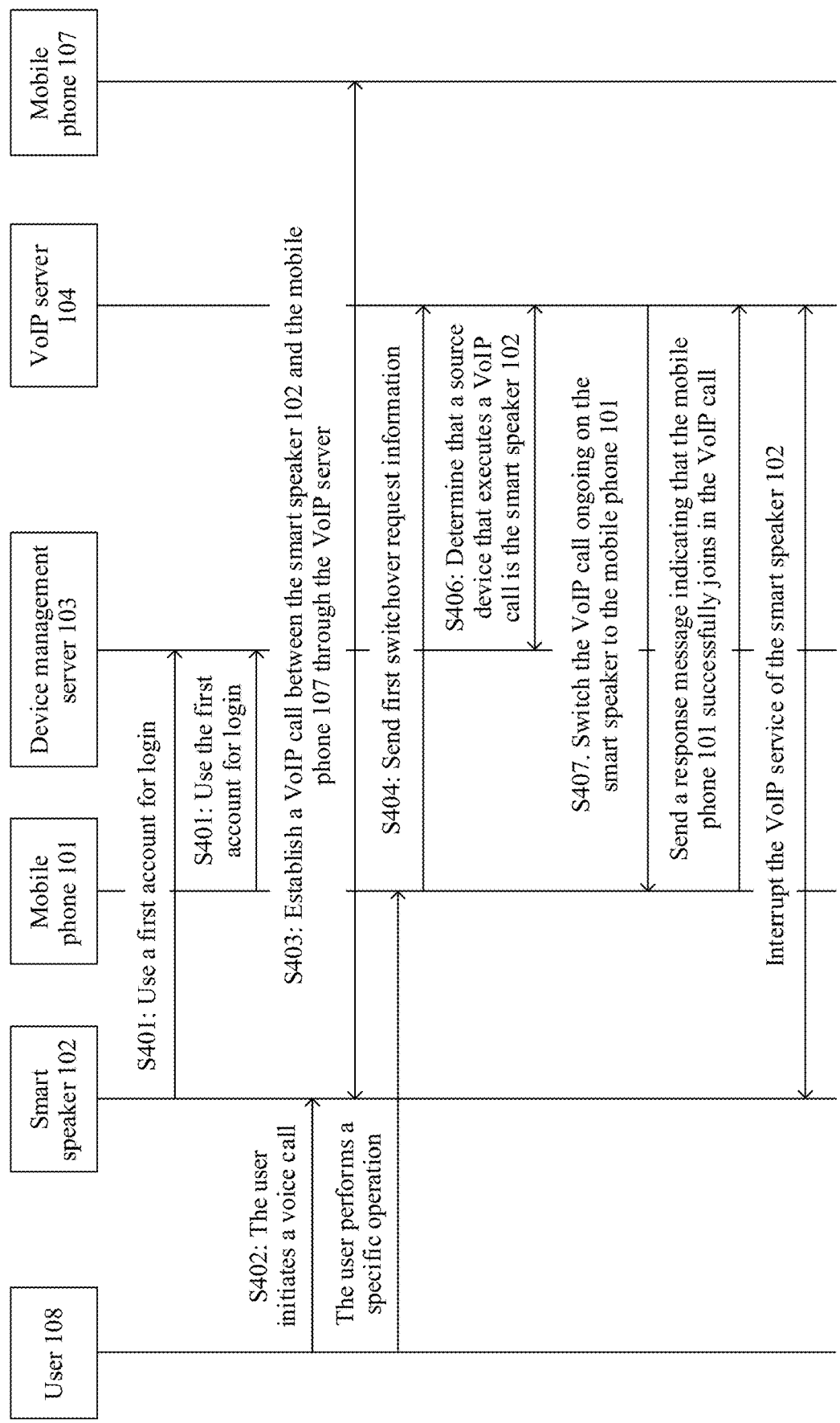
FIG. 4 is a schematic flowchart of a voice switchover method according to an embodiment.

For example, as shown in FIG. 4, an embodiment provides a voice switchover method. The method may be implemented in the electronic device and the server in the foregoing embodiments, and may include the following steps.

Step S401: Use a first account to log in to the device management server 103 on both the mobile phone 101 and the smart speaker 102.

The first account (for example, HUAWEI-01) may be an account of a specific application (for example, Kugou Music), or may be an account of a specific service (for example, a Huawei cloud service).

For example, if an app Kugou Music is installed on each of the mobile phone 101 and the smart speaker 102, the user 108 may log in, on the app Kugou Music of the mobile phone 101 by using the account (HUAWEI-01), to the device management server 103 corresponding to the app. In addition, the user 108 may also log in, on the app Kugou Music of the smart speaker 102 by using the same account (HUAWEI-01), to the device management server 103 corresponding to the app. For another example, if both the mobile phone 101 and the smart speaker 102 are electronic devices of a Huawei brand, both the mobile phone 101 and the smart speaker 102 may provide the Huawei cloud service for the user 108. In this case, the user may login, on the mobile phone 101 by using the account (HUAWEI-01), to the device management server 103 corresponding to the Huawei cloud service, and the user 108 may also log in, on the smart speaker 102 by using the same account (HUAWEI-01), to the device management server 103 corresponding to the Huawei cloud service.

The device management server 103 stores the account and device information, for example, device identities (as shown in Table 1), of electronic devices on which the account is used for login. After the same account is used to log in to the device management server 103 on both the mobile phone 101 and the smart speaker 102, the device management server 103 may establish a correspondence between the first account and an electronic device on which the first account is used. In this way, specific electronic devices on which a specific account is used for login can be found on the device management server 103.

Step S402: The smart speaker 102 detects an input operation indicating that the user 108 initiates a voice call.

Step S403: In response to the input operation, the smart speaker 102 establishes a VoIP call between the smart speaker 102 and a third electronic device (for example, the mobile phone 107 shown in FIG. 1) through the VoIP server 104.

For example, if the user 108 needs to use a VoIP service to make a call with a contact (for example, Susan), the user 108 may initiate an input operation of a VoIP voice call on the smart speaker 102. The input operation may be specifically an operation that the user 108 enters a phone number of Susan on a display 394 of the smart speaker 102.

In some other embodiments, the input operation may alternatively be a voice input operation performed by the user 108 on the smart speaker 102. For example, the user 108 may say "Call Susan" to the smart speaker 102. After collecting the voice signal, the smart speaker 102 may perform voice recognition on the voice signal by using a voice assistant system of the smart speaker 102, to obtain a control instruction corresponding to the voice signal. For example, the voice assistant system recognizes, based on the voice signal, that a control instruction is "calling the contact Susan". Further, the smart speaker 102 may send, according to the phone number of Susan in an address book, a call request for calling the phone number to the VoIP server 104, so that the VoIP server 104 calls a mobile phone 107 of the contact Susan. Subsequently, if the called mobile phone 107 successfully answers the call initiated by the smart speaker 102, the mobile phone 107 may send, to the VoIP server 104, a message indicating that the call is successfully answered, to establish a VoIP call between the smart speaker 102 and a called party (that is, the mobile phone 107 of the contact Susan). In this way, the user can make a VoIP call with the contact by using the smart speaker 102.

It may be understood that, in the embodiments of this application, the smart speaker 102 may collect voice inputs (that is, voice signals) of the user from different directions by using one or more microphone arrays 370B; and the smart speaker 102 may play, by using one or more speaker arrays 370A, a voice feedback provided by the voice assistant system in response to a voice recognition result.

In some embodiments, after collecting a voice signal of the user, the smart speaker 102 may also send the voice signal to a voice assistant server 105, and the voice assistant server 105 performs voice recognition on the voice signal to obtain a control instruction corresponding to the voice signal. When the control instruction obtained through recognition is related to a VoIP service, the voice assistant server 105 may send the control instruction obtained through recognition to the VoIP server 104, and the VoIP server 104 establishes a VoIP service between the smart speaker 102 and the called party according to the foregoing method. Certainly, the user may initiate a call operation of the VoIP service by inputting a voice signal, or may initiate a call operation of the VoIP service by performing a preset gesture or in another manner. This is not limited in this embodiment of this application.

Step S404: The mobile phone 101 sends first switchover request information to the VoIP server 104, where the first switchover request information is used to request the VoIP server 104 to switch a VoIP service ongoing on the smart speaker 102 to the mobile phone 101 for continuing the VoIP service.

In some embodiments, the first switchover request information may include the first account.

In some application scenarios, the user may expect to switch a VoIP call ongoing on the smart speaker 102 to the mobile phone 101 for execution. For example, the smart speaker 102 is located in a home of the user 108, and the user may use the smart speaker 102 to make a VoIP call with another electronic device (for example, the mobile phone 107) at home. When the user leaves home, the user needs to continue the VoIP call with the mobile phone 107 by using the mobile phone 101 with better portability. In this case, the user needs to switch the VoIP service ongoing on the smart speaker 102 to the mobile phone 101 for continuing the VoIP service.

To implement a function of switching a VoIP service between the mobile phone 101 and the smart speaker 102, the mobile phone 101 may preset a specific operation used to switch the VoIP service. For example, the specific operation may be an input operation such as flipping a mobile phone, tapping a screen by using a knuckle, double tapping a power key, or a sliding operation. Alternatively, the specific operation may be a preset voice input. For example, the user 108 may input, to the mobile phone 101, a voice instruction of "switching a voice call" in a voice manner. It may be understood that a person skilled in the art may set the preset operation based on an actual application scenario or actual experience. This is not limited in this embodiment.

In this case, when the mobile phone 101 detects an input operation performed by the user on the mobile phone 101, if the mobile phone 101 determines that the input operation is the specific operation, the mobile phone 101 may send the first switchover request information to the VoIP server 104 in response to determining of the specific operation.

In other words, when the mobile phone 101 detects the specific operation, it indicates that the user 101 needs to switch a VoIP service ongoing under the first account (for example, HUAWEI-01) to the mobile phone 101 at this time. Further, in response to the specific operation, the mobile phone 101 may send the first switchover request information to the VoIP server 104 through the network 109.

For example, it may be preset that the specific operation is a slide gesture on a touchscreen of the mobile phone 101. For example, when a sliding track of a slide gesture is X-shaped, the slide gesture is used to indicate to switch a VoIP call ongoing on the mobile phone 101 to the smart speaker 102 of the user, and the mobile phone 101 may use the smart speaker 102 as a target device for the VoIP call. When a sliding track of a slide gesture is Y-shaped, the slide gesture is used to indicate to switch a VoIP call ongoing on the mobile phone 101 to a tablet computer 111 (which is not shown in the figure) of the user. In this case, if it is detected that a sliding track of a sliding operation performed by the user is X-shaped, the mobile phone 101 may use the tablet computer 111 as the target device for the VoIP call.

In some other embodiments, the first switchover request information may further include a VoIP identifier of the mobile phone 101 in the VoIP service (for example, a phone number or an IP address of the mobile phone 101), and a VoIP identifier of the smart speaker 102 in the VoIP service.

In some embodiments, the first switchover request information may further include a device identity of the mobile phone 101, so that the VoIP server 104 performs validity verification on the electronic device 101 after receiving the first switchover request information. In this way, voice switchover security is further improved.

In some other embodiments, the mobile phone 101 may further automatically send the first switchover request information to the VoIP server 104 through the network 109 based on a detected specific condition, and the user does not need to input, as described in the foregoing embodiment, a specific operation to the mobile phone 101 for trigger.

In some embodiments, the specific condition may be Wi-Fi signal strength in a WLAN network. For example, both the mobile phone 101 and the smart speaker 102 are connected to a same Wi-Fi network. In other words, the two electronic devices may access the WLAN network by using a same service set identifier (SSID) in the network. Because the mobile phone 101 is more portable than the smart speaker 102, when the mobile phone 101 and the smart speaker 102 access a same Wi-Fi network (for example, a Wi-Fi network with an SSID name of "123"), the mobile phone 101 may determine, based on a detected change of Wi-Fi signal strength of the Wi-Fi network, whether to send the first switchover request information to the VoIP server 104. For example, when the mobile phone 101 cannot detect a Wi-Fi signal of the network or a detected Wi-Fi signal is lower than a preset threshold, the mobile phone 101 may automatically send the first switchover request information to the VoIP server 104. The foregoing case indicates that the user has carried the mobile phone 101 far away from the Wi-Fi network and the smart speaker 102. In this case, the mobile phone 101 may request the VoIP server 104 to switch a VoIP call ongoing on the smart speaker 102 to the mobile phone 101. In this way, the user can conveniently continue the VoIP call on the mobile phone 101.

In some other embodiments, the specific condition may alternatively be Bluetooth signal strength. For example, a Bluetooth connection may be established between the mobile phone 101 and the smart speaker 102. In this case, the mobile phone 101 may determine, based on detected Bluetooth signal strength between the mobile phone 101 and the smart speaker 102, whether to send the first switchover request information to the VoIP server 104. For example, when the mobile phone 101 detects that the Bluetooth connection between the mobile phone 101 and the smart speaker 102 is disconnected, or when the mobile phone 101 detects that Bluetooth signal strength of the smart speaker 102 is less than a preset threshold, the mobile phone 101 may automatically send the first switchover request information to the VoIP server 104. The foregoing case indicates that the user has carried the mobile phone 101 far away from the smart speaker 102. In this case, the mobile phone 101 may request the VoIP server 104 to seamlessly switch a VoIP call ongoing on the smart speaker 102 to the mobile phone 101. In this way, the user can conveniently continue the VoIP call on the mobile phone 101.

It should be noted that a person skilled in the art may set, based on an actual application scenario or actual experience, another technical solution for triggering the mobile phone

101 to send the first switchover request information to the VoIP server 104. This is not limited in this embodiment of this application. For example, the mobile phone 101 may be connected to a dock device in a wired manner, and is connected to the smart speaker 102 through the dock device. When it is detected that the mobile phone 101 is plugged out of the dock device, in response to this event, the mobile phone 101 may automatically send the first switchover request information to the VoIP server 104 through the network 109.

Step S405: The VoIP server 104 receives the first switchover request information sent by the mobile phone 101.

Step S406: In response to the received first switchover request information, the VoIP server 104 determines that a source device for a VoIP service corresponding to the first account is the smart speaker 102.

For example, after receiving the first switchover request information sent by the mobile phone 101 through the network 109, the VoIP server 104 may send, to the device management server 103, the first account (that is, HUAWEI-01) carried in the first switchover request information. Because the device management server 103 stores accounts, device identities of electronic devices, and the like (as shown in Table 1), the device management server 103 may find, based on the first account sent by the VoIP server 104, each electronic device on which the first account is used for login, for example, the first account is also used for login on the smart speaker 102. Certainly, there may be one or more electronic devices on which the first account is used for login. The device management server 103 may send, to the VoIP server 104 through the network 109, device identities of all electronic devices on which the first account is used for login. In some other cases, the device management server 103 may alternatively send, to the VoIP server 104, a device identity of an electronic device that supports the VoIP service and that is in all electronic devices on which the first account is used for login.

After receiving the device identity sent by the device management server 103, the VoIP server 104 may query for, based on the device identity, a source device on which a VoIP service is ongoing under the first account. For example, the device management server 103 finds a device identity of the smart speaker 102 based on the account HUAWEI-01, and sends the device identity to the VoIP server 104. The VoIP server 104 may accordingly determine that a source device on which a VoIP service is ongoing is the smart speaker 102, in other words, the user needs to switch, the VoIP service ongoing on the smart speaker 102 to the mobile phone 101.

Figure 5:
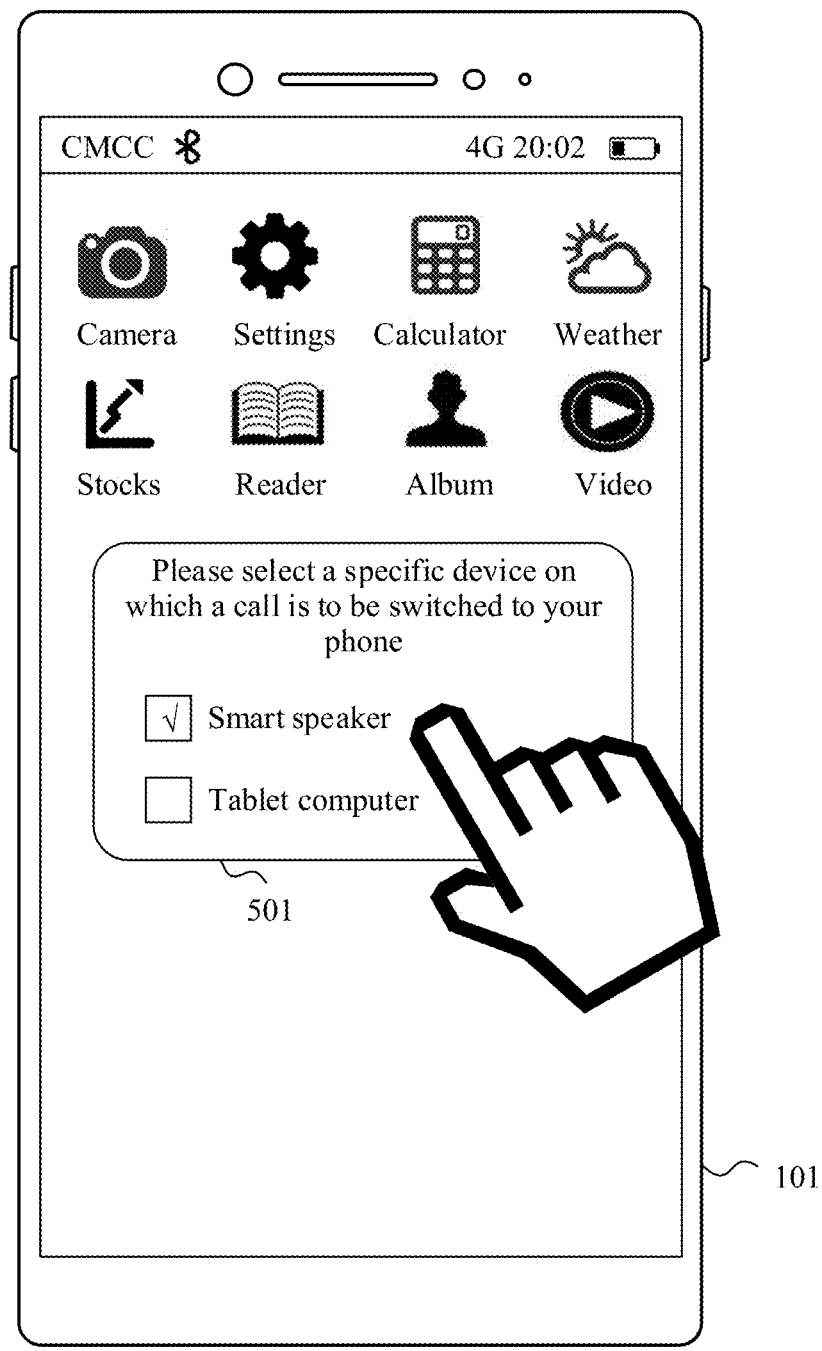
FIG. 5 is a schematic diagram of a user interface of a first electronic device according to an embodiment.

In some other embodiments, if a VoIP service is ongoing on each of two or more of electronic devices on which the first account is used for login, for example, the VoIP service is also ongoing on the tablet computer 111 in addition to the smart speaker 102, the VoIP server 104 may send device identities of the two electronic devices to the mobile phone 101 through the network 109. In this case, as shown in FIG. 5, a prompt box 501 may be displayed on the touchscreen of the mobile phone 101. The prompt box 501 includes one or more options, and a list of the options is a list of a plurality of source devices on which the VoIP service is ongoing under the first account (for example, HUAWEI-01). In this case, the user may select, in the prompt box 501, a specific electronic device on which the VoIP service is ongoing is switched to the mobile phone 101. For example, after the mobile phone 101 detects that the user selects an option representing the smart speaker 102, the mobile phone 101 may send the identity of the smart speaker 102 to the VoIP server 104. In this way, the VoIP server 104 may determine that the source device for the VoIP service that the user needs to switch is the smart speaker 102.

Step S407: The VoIP server 104 switches a VoIP call ongoing on the smart speaker to the mobile phone 101.

For example, the VoIP server 104 may first add the mobile phone 101 to a VoIP call between the smart speaker 102 and the mobile phone 107. Specifically, the VoIP server 104 may add the mobile phone 101 to a VoIP service between the smart speaker 102 and the mobile phone 107 based on a VoIP identifier of the mobile phone 101 in the VoIP service. In this case, a multi-party call of the VoIP service is established among the mobile phone 101, the smart speaker 102, and the mobile phone 107.

The VoIP identifier of the mobile phone 101 may be carried in the first switchover request information of the mobile phone 101. Alternatively, the VoIP server 104 may pre-register a VoIP identifier of each electronic device in the VoIP service. In this way, the VoIP identifier of the mobile phone 101 in the VoIP service can be found on the VoIP server 104.

After the multi-party call of the VoIP service is established among the mobile phone 101, the smart speaker 102, and the mobile phone 107, the mobile phone 101 may send, to the VoIP server 104 through the network 109, a response message indicating that the mobile phone 101 successfully joins in the VoIP service.

After receiving the response message, the VoIP server 104 interrupts the VoIP service on the smart speaker 102. After the interruption, only the mobile phone 101 and the mobile phone 107 are in the VoIP call.

In some embodiments, after the VoIP server 104 adds the mobile phone 101 to the VoIP service between the smart speaker 102 and the mobile phone 107, if the mobile phone 101 successfully accesses the VoIP service, it indicates that the user has answered the VoIP voice call between the smart speaker 102 and the mobile phone 107 by using the mobile phone 101. Further, the mobile phone 101 may send, to the VoIP server 104, a response message indicating that the mobile phone 101 successfully joins in the VoIP service. After receiving the response message, the VoIP server 104 may remove the smart speaker 102 from the multi-party call made by the mobile phone 101, the smart speaker 102, and the mobile phone 107, that is, interrupt the VoIP service on the smart speaker 102, so that the VoIP service is switched from the smart speaker 102 to the mobile phone 101 for continuing the VoIP service.

It can be learned that, before the mobile phone 101 sends, to the VoIP server 104, the response message indicating that the mobile phone 101 successfully joins in the VoIP service, both the smart speaker 102 and the mobile phone 101 has accessed the VoIP service. The mobile phone 101 sends the response message to the VoIP server 104 only after the user answers the VoIP voice call on the mobile phone 101, to trigger the VoIP server 104 to interrupt the VoIP service on the smart speaker 102. In this way, the VoIP service is not interrupted during switchover between the mobile phone 101 and the smart speaker 102, and seamless connection of the VoIP voice call can be implemented when the user switches the VoIP voice call from the smart speaker 102 to the mobile phone 101, thereby increasing voice switchover efficiency between a plurality of devices and improving user experience.

In some other embodiments, the VoIP server 104 may alternatively transfer a VoIP call on the smart speaker 102 to the mobile phone 101 based on a VoIP identifier of the mobile phone 101 in a VoIP service (for example, a phone number of the mobile phone 101) by using a call transfer service. In this way, the VoIP call ongoing on the smart speaker 102 is switched to the mobile phone 101 for continuing the VoIP call.

In the technical solution provided in the foregoing embodiment, a source device for the VoIP service is the smart speaker 102, and a target device for the VoIP service is the mobile phone 101. The mobile phone 101 may respond to a specific operation of the user to identify a VoIP service switchover requirement. Further, the mobile phone 101 may send the first switchover request information to the VoIP server 104, so that the VoIP server 104 seamlessly switches a VoIP service ongoing on the smart speaker 102 under a same account to the mobile phone 101. In a switchover process, the VoIP service is not interrupted, and the user does not need to perform repeated operations between a plurality of devices, thereby increasing efficiency of voice switchover between the plurality of devices and improving user experience.

In some other application scenarios, if the user expects to switch a VoIP call ongoing on the smart speaker 102 to the mobile phone 101, the user may input a specific operation on the smart speaker 102, to trigger the VoIP server 104 to switch the VoIP call on the smart speaker 102 to another electronic device (for example, the mobile phone 101) on which a same account is used for login.

Figure 6:
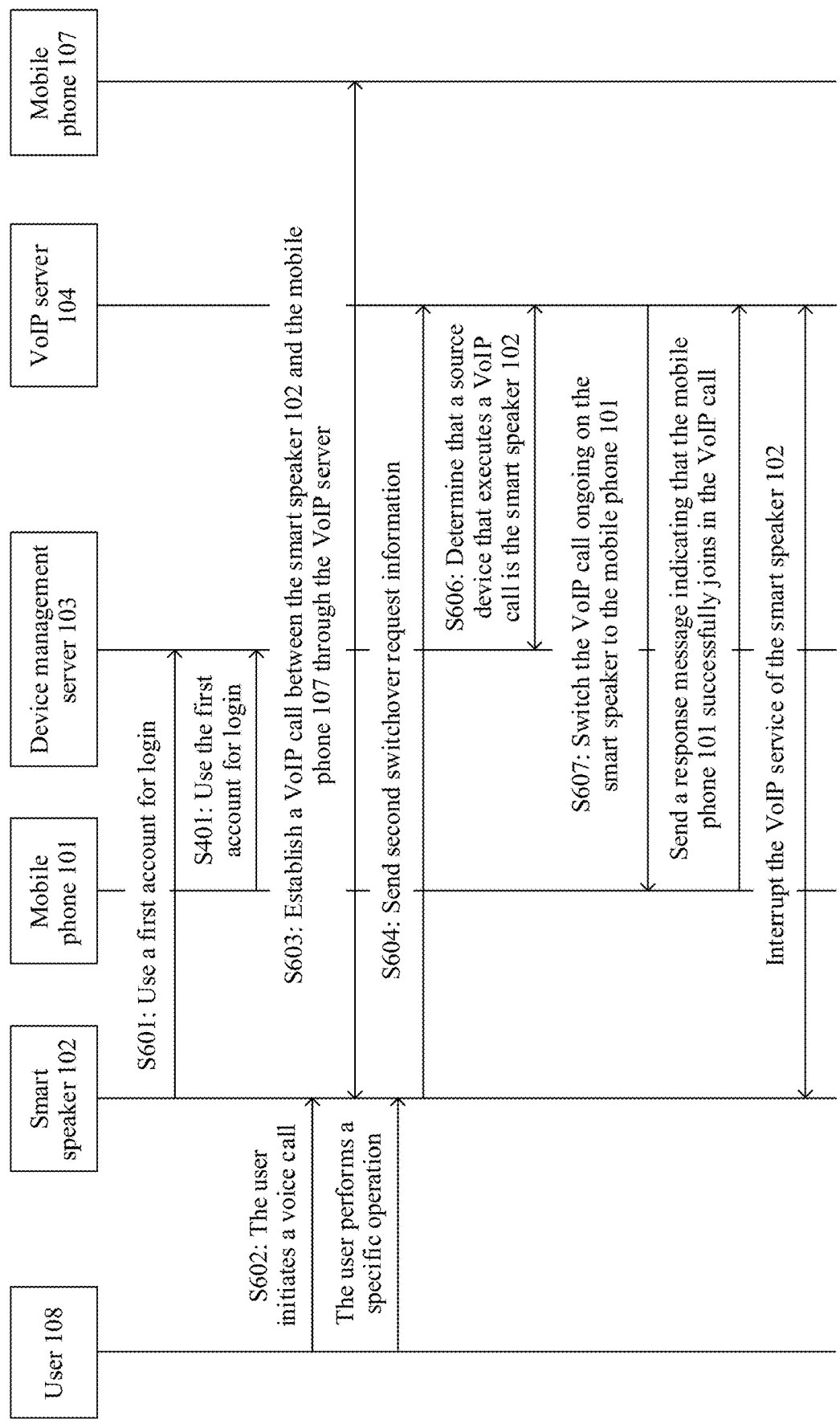
FIG. 6 is a schematic flowchart of a voice switchover method according to another embodiment.

For example, as shown in FIG. 6, a voice switchover method provided in an embodiment includes the following steps.

Step S601: Use a first account to log in to a device management server 103 on both a mobile phone 101 and a smart speaker 102.

Step S602: The smart speaker 102 detects an input operation indicating that a user 108 initiates a voice call.

Step S603: In response to the input operation, the smart speaker 102 establishes a VoIP call between the smart speaker 102 and a third electronic device (for example, the mobile phone 107 shown in FIG. 1) through a VoIP server 104.

For a specific implementation method of steps S601 to S603, refer to related descriptions of steps S401 and S402 in the foregoing embodiment. Details are not described herein again.

Step S604: The smart speaker 102 sends second switchover request information to the VoIP server 104, where the second switchover request information is used to request the VoIP server 104 to switch a VoIP service ongoing on the smart speaker 102 to the mobile phone 101 for continuing the VoIP service.

The second switchover request information may include the first account.

In this application scenario, the user expects to switch a VoIP call ongoing on the smart speaker 102 to the mobile phone 101 for execution. The user may perform an input operation on a source device (that is, the smart speaker 102), to trigger the VoIP server 104 to switch the VoIP call ongoing on the smart speaker 102 to the mobile phone 101 for execution.

For example, the input operation may be a voice input of the user. For example, when the user expects to switch the VoIP call ongoing on the smart speaker 102 to the mobile phone 101 for execution, a voice assistant system of the smart speaker 102 may be in an inactive state. In this case, the user may first input a wakeup word, for example, "Hello, smart-E", to the smart speaker 102 in a voice manner. When the smart speaker 102 detects the wakeup word, the voice assistant system of the smart speaker 102 is started, and collects a further voice input of the user, so that the voice assistant system performs voice recognition processing on the voice input.

In some embodiments, after the voice assistant system is woken up, the user may continue to input a voice to the smart speaker 102. For example, the voice input of the user may be "Switch a voice call to my mobile phone", that is, a target device on which the VoIP call is executed is to be switched to the mobile phone 101 of the user. After the smart speaker 102 performs voice recognition on the voice input, the smart speaker 102 may generate the second switchover request information, and send the second switchover request information to the VoIP server 104. The second switchover request information is used to request the VoIP server 104 to switch the ongoing VoIP call to the mobile phone 101. The second switchover request information may include a first account (for example, HUAWEI-01) currently used for login on the smart speaker 102 and a device identity of the target device (that is, the mobile phone 101).

In some other embodiments, the voice input may alternatively be "Switch a voice call". After performing voice recognition on the voice input, the smart speaker 102 may determine that an operation intention of the user is to switch the VoIP call ongoing on the smart speaker 102 to another electronic device of the user; however, a specific electronic device of the user to which the VoIP call is to be switched for continuing the VoIP call is not clearly indicated in the voice input. In this case, the second switchover request information generated by the smart speaker 102 may include the first account currently used for login on the smart speaker 102, but does not include a device identity of the target device (that is, the mobile phone 101).

In some other embodiments, it may be preset on the smart speaker 102 that the VoIP call is switched to another default electronic device of the user, for example, the mobile phone 101, for continuing the VoIP call. In this case, when the target device is not indicated in the voice input, the smart speaker 102 may use, by default, the mobile phone 101 of the user as the target device on which the VoIP call is to be executed after switchover. In this case, the second switchover request information generated by the smart speaker 102 may further include a device identity of the default target device (that is, the mobile phone 101).

In some other embodiments, after collecting the voice input of the user, the smart speaker 102 may alternatively send the voice input to a voice assistant server 105 through a network 109, and the voice assistant server 105 performs voice recognition on the voice input. Further, the voice assistant server 105 may feed back a voice recognition result to the smart speaker 102, and the smart speaker 102 generates the second switchover request information based on the voice recognition result and sends the second switchover request information to the VoIP server 104 through the network 109.

In some other embodiments, alternatively, the smart speaker 102 may automatically send the second switchover request information to the VoIP server 104 through the network 109 based on a detected specific condition, and the user does not need to input a voice input to the smart speaker 102.

For example, the specific condition may be Wi-Fi signal strength in a WLAN network. Both the mobile phone 101 and the smart speaker 102 are connected to a Wi-Fi network of a same router. When the router detects that the mobile phone 101 is disconnected from the Wi-Fi network at a specific moment, or a detected Wi-Fi signal of the mobile phone 101 is lower than a preset threshold, the router may automatically send a piece of notification information to the smart speaker 102. The notification information indicates that the mobile phone 101 has been away from the Wi-Fi network. In this case, the smart speaker 102 may automatically send the second switchover request information to the VoIP server 104 through the network 109, to request the VoIP server 104 to switch a VoIP call ongoing on the smart speaker 102 to the mobile phone 101. In this way, the user can conveniently continue the VoIP call on the mobile phone 101. In this scenario, the user is first being in the VoIP call with the mobile phone 107 by using the smart speaker 102, and then the user picks up the mobile phone, and moves away from both the smart speaker 102 and the Wi-Fi network. In this case, the VoIP call is automatically switched to the mobile phone of the user, so as to continue the VoIP call. In this way, efficiency of the VoIP call is increased, and user experience is also improved.

For example, the specific condition may alternatively be Bluetooth signal strength. For example, a Bluetooth connection may be established between the mobile phone 101 and the smart speaker 102. In this case, the smart speaker 102 may determine, based on detected Bluetooth signal strength between the mobile phone 101 and the smart speaker 102, whether to automatically send the second switchover request information to the VoIP server 104. For example, when the smart speaker 102 detects that the Bluetooth connection between the smart speaker 102 and the mobile phone 101 is disconnected, or when the smart speaker 102 detects that Bluetooth signal strength of the mobile phone 101 is less than a preset threshold, the smart speaker 102 may automatically send the second switchover request information to the VoIP server 104.

It should be noted that a person skilled in the art may set, based on an actual application scenario or actual experience, a specific technical solution for sending the second switchover request information to the VoIP server 104 by the smart speaker 102. This is not limited in this embodiment. For example, it may be preset on the smart speaker 102 that a gesture of tapping the smart speaker 102 once is used to trigger the smart speaker 102 to switch the ongoing VoIP call to the mobile phone, and that a gesture of tapping the smart speaker 102 twice is used to trigger the smart speaker 102 to switch the VoIP call to a tablet computer 111.

Step S605: The VoIP server 104 receives the second switchover request information sent by the smart speaker 102.

Step S606: In response to the received second switchover request information, the VoIP server 104 determines that a source device for a VoIP service corresponding to the first account is the smart speaker 102.

Step S607: The VoIP server 104 switches the VoIP call to the mobile phone 101 for continuing the VoIP call.

First, the VoIP server 104 may determine, from a plurality of electronic devices on which the first account is used for login, that a target device on which the VoIP call is to be executed is the mobile phone 101. After receiving the second switchover request information sent by the smart speaker 102, the VoIP server 104 may send, to the device management server 103, the first account (that is, HUAWEI-01) carried in the second switchover request information. The device management server 103 may further find all electronic devices on which the first account is used currently. For example, in addition to the smart speaker 102, the first account is also used for login on both the mobile phone 101 and the tablet computer 111. In this case, the device management server 103 may send device identities of the mobile phone 101 and the tablet computer 111 to the VoIP server 104 through the network 109, and the VoIP server 104 determines, from these electronic devices, the target device that subsequently replaces the smart speaker 102 to continue executing the VoIP call.

For example, if the second switchover request information carries a device identity of the target device (for example, a device identity of the mobile phone 101), the VoIP server 104 may query, from the device identities sent by the device management server 103, whether the device identity of the mobile phone 101 is included. If the device identity of the mobile phone 101 is included, the VoIP server 104 may determine that the target device on which the VoIP call is to be executed is the mobile phone 101.

Alternatively, if the second switchover request information does not carry an identity of the target device, the VoIP server 104 may select one device identity from the device identities sent by the device management server 103, as the device identity of the target device on which the VoIP call is to be executed subsequently.

Figure 7:
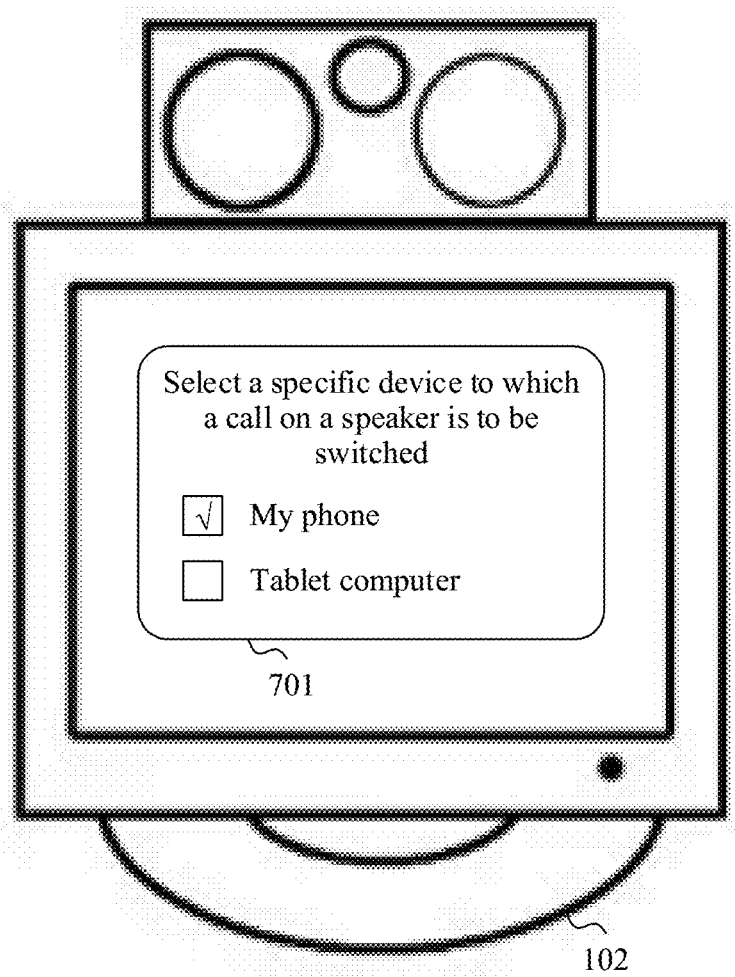
FIG. 7 is a schematic diagram of a user interface of a second electronic device according to another embodiment.

Alternatively, if the second switchover request information does not carry a device identity of the target device, the VoIP server 104 may send, to the smart speaker 102 through the network 109, device identities of a plurality of electronic devices sent by the device management server 103. As shown in FIG. 7, the smart speaker 102 may display a prompt box 701, and list, in the prompt box 701, options of target devices on which a VoIP call can be continued under the first account. In this case, the user can manually select, in the prompt box 701, a specific electronic device to which the VoIP call on the smart speaker 102 is switched for execution. For example, after detecting that the user selects the mobile phone 101 in the prompt box 901, the smart speaker 102 may send the device identity of the mobile phone 101 to the VoIP server 104. In this way, the VoIP server 104 can determine that a target device on which the VoIP call is to be executed subsequently is the mobile phone 101.

The VoIP server 104 may pre-register a VoIP identifier of each electronic device in the VoIP service. The VoIP identifier may be a phone number, an IP address, or the like used when the VoIP service is executed. In this case, after determining that the mobile phone 101 is the target device that subsequently replaces the smart speaker 102 to continue executing the VoIP call, the VoIP server 104 may find a VoIP identifier of the mobile phone 101. For example, a phone number of the mobile phone 101 is 123456. The VoIP server 104 may further add the mobile phone 101 to the VoIP call between the smart speaker 102 and the mobile phone 107 based on the phone number. In this case, the VoIP server 104 establishes a multi-party VoIP call among the mobile phone 101, the smart speaker 102, and the mobile phone 107. Then, the VoIP server 104 interrupts the VoIP service on the smart speaker 102. After the interruption, only the mobile phone 101 and the mobile phone 107 are in the VoIP call, that is, the VoIP call is switched to the mobile phone 101. In this case, the mobile phone 101 and the mobile phone 107 execute the VoIP call.

In the voice switchover method provided in this embodiment, a source device for the VoIP service is the smart speaker 102, and a target device for the VoIP service is the mobile phone 101. The smart speaker 102 may respond to a trigger operation performed by the user, to identify a VoIP service switchover requirement. Further, the smart speaker 102 may send the second switchover request information to the VoIP server 104, so that the VoIP server 104 seamlessly switches a VoIP service ongoing on the smart speaker 102 under a same account to the mobile phone 101 for continuing the VoIP service. In a switchover process, the VoIP service is not interrupted, and the user does not need to perform repeated operations between a plurality of devices, thereby increasing efficiency of voice switchover between the plurality of devices and improving user experience.

In some other application scenarios, after the user logs in to the device management server 103 on the mobile phone 101 and the smart speaker 102 by using a same account, a difference from the application scenario in the foregoing embodiment lies in that, the user may perform a VoIP service with another electronic device (for example, the mobile phone 107) by using the mobile phone 101. Subsequently, if the user expects to switch the VoIP service from the mobile phone 101 to the smart speaker 102, the user may perform a preset input operation on the smart speaker 102 or the mobile phone 101, to trigger the VoIP server 104 to automatically switch the VoIP call ongoing on the mobile phone 101 to the smart speaker 102, or automatically perform, when the mobile phone 101 or the smart speaker 102 detects a specific condition, a process of switching the VoIP call to the smart speaker 102. A specific technical solution in this application scenario is similar to the technical solution in the foregoing embodiment, and details are not described herein again. It should be noted in detail that, in this application scenario, the mobile phone 101 or the smart speaker 102 may detect the following several specific conditions.

For example, the specific condition may be current status information of the mobile phone 101. The mobile phone 101 may collect various environment information, various mobile phone posture information, and the like by using one or more sensors 180. For example, when the mobile phone detects, by using an acceleration sensor 180E, that the mobile phone is currently static for more than a preset time period, and the mobile phone has accessed a same Wi-Fi network as the smart speaker 102, the mobile phone 101 may automatically send switchover request information to the VoIP server 104 based on the detected status information, so that the VoIP server 104 automatically switches a VoIP call ongoing on the mobile phone 101 to the smart speaker 102.

For example, the specific condition may alternatively be a Bluetooth connection established between the mobile phone 101 and the smart speaker 102. For example, the user initially makes a VoIP call with the mobile phone 107 on the mobile phone 101; and when the user arrives at home, the mobile phone 101 may automatically establish a Bluetooth connection to the smart speaker 102. After the Bluetooth connection is established between the two devices, the mobile phone 101 or the smart speaker 102 may automatically send switchover request information to the VoIP server 104, so that the VoIP server 104 automatically switches the VoIP call ongoing on the mobile phone 101 to the smart speaker 102.

In some other application scenarios, after the user logs in to the device management server 103 on the mobile phone 101 and the smart speaker 102 by using a same account, the user may use the smart speaker 102 to execute an audio playing service/a video playing service. If the user expects to switch the audio playing service from the smart speaker 102 to the mobile phone 101, the user may perform a preset specific operation on the mobile phone 101 or the smart speaker 102, to trigger a content server 106 to switch the audio playing service on the smart speaker 102 to the mobile phone 101.

Figure 8:
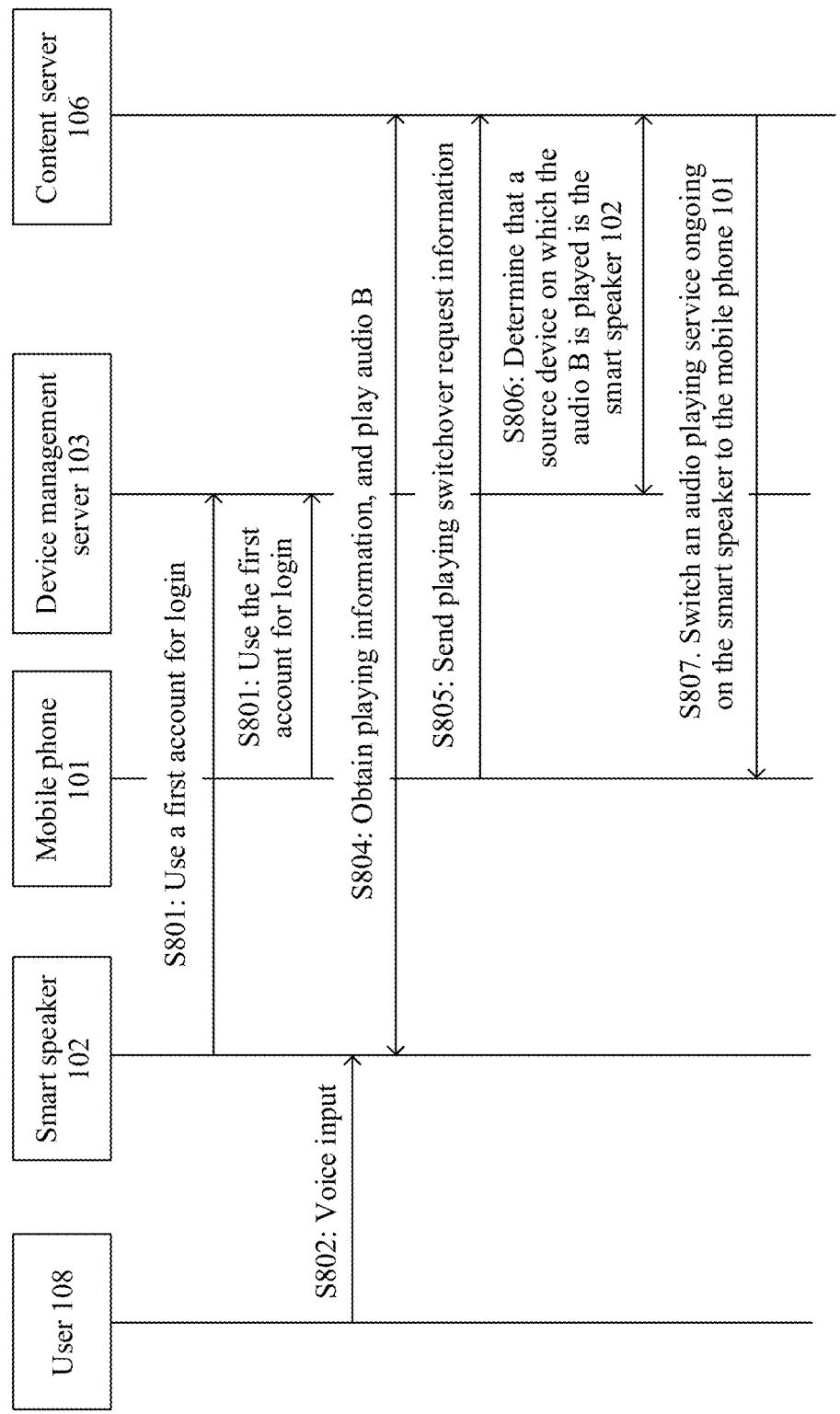
FIG. 8 is a schematic flowchart of a voice switchover method according to another embodiment.

For example, as shown in FIG. 8, a voice switchover method provided in an embodiment includes the following steps.

Step S801: Use a same account (for example, a first account) to log in to a device management server 103 on both a mobile phone 101 and a smart speaker 102.

For a specific method for using the first account to log in to the device management server 103 on the mobile phone 101 and the smart speaker 102, refer to the foregoing related embodiments. Details are not described herein again.

Step S802: The smart speaker 102 receives a voice input from a user, where the voice input is used to indicate the smart speaker 102 to play audio B.

Step S803: In response to the voice input, the smart speaker 102 determines a playing instruction for the audio B.

Step S804: The smart speaker 102 obtains playing information from a content server 106 according to the playing instruction, and plays the audio B.

When the user expects to play specific audio B (for example, a song Silence) by using the smart speaker 102, the user may say "I want to listen to the song Silence" to the smart speaker 102. Further, the smart speaker 102 recognizes the voice input as a voice instruction by using a voice assistant system provided on the smart speaker 102. The voice instruction is used to indicate to play the song Silence. Then, the smart speaker 102 sends audio playing request information to the content server 106 through a network 109. After receiving the request information, the content server 106 provides, for the smart speaker 102, a service for playing the song Silence. Further, the smart speaker 102 plays, by using one or more speaker arrays 370A of the smart speaker 102, the song Silence from the playing information obtained from the content server 106.

In some other embodiments, after collecting the voice input from the user, the smart speaker 102 may carry the voice input in a recognition request and send the recognition request to a voice assistant server 105 through the network 109. The voice assistant server 105 may perform voice recognition on the voice input based on a voice recognition algorithm, to obtain a playing instruction for the song Silence. The voice assistant server 105 sends the playing instruction obtained through recognition to the content server 106, and the content server 106 provides, for the smart speaker 102, a service for playing the song Silence.

In some other embodiments, in addition to a manner of triggering, in a voice input manner, the smart speaker 102 to execute an audio playing service, the user may alternatively trigger, in another preset manner, the smart speaker 102 to obtain a playing instruction for specific audio. This is not limited in this embodiment of this application. For example, when it is detected that the user taps the smart speaker 102, it indicates that the user expects to continue to play a program (for example, a program C) that is listened to most recently, and the smart speaker 102 may generate a playing instruction for the program C and send the playing instruction to the content server 106. For another example, if a touchscreen is disposed in the smart speaker, the user may select, on the touchscreen, audio that needs to be played, so as to trigger the smart speaker 102 to generate a playing instruction for the audio and send the playing instruction to the content server 106.

The content server 106 may be configured to maintain resource information of audio content such as music and a program. After the voice assistant server 105 sends the playing instruction that is for the audio and that is obtained through recognition to the content server 106, the content server 106 may search for resource information of the audio B. The resource information may be an audio resource of the audio B, or may be a playing address or a download address of the audio B, or the like. The content server 106 sends the resource information of the audio B to the smart speaker 102, so that the smart speaker 102 plays the audio B based on the resource information. For example, the resource information of the audio B is a playing address of the audio B, and the content server 106 may send the playing address of the audio B to the smart speaker 102. In this way, the smart speaker 102 may obtain the audio resource of the audio B according to the playing address, and further execute an audio playing service for the audio B.

It may be understood that the content server 106 may store information such as an audio resource and a device identity of a device that requests playing, to facilitate subsequent further processing.

Step S805: The mobile phone 101 sends a playing switchover request to the content server 106.

Step S806: In response to the playing switchover request, the content server 106 determines that a source device on which the audio B is played is the smart speaker 102.

Step S807: The content server 106 switches the audio playing service to the mobile phone 101 to continue the audio playing service.

In some embodiments, the playing switchover request may include a first account, and the first account is used to log in to the device management server 103 on both the mobile phone 101 and the smart speaker 102. In some other embodiments, the playing switchover request may further include a device identity of the mobile phone 101 and/or a device identity of the smart speaker 102.

When the user expects to switch the audio B that is being played on the smart speaker 102 to the mobile phone 101 for continuing playing, the user may input a preset specific operation on the mobile phone 101. In response to the specific operation, the mobile phone 101 may send a playing switchover request to the content server 106, and the content server 106 determines that the source device on which the audio B is being played is the smart speaker 102.

The content server 106 may send the first account to the device management server 103, and the device management server 103 searches for specific electronic devices on which the first account is currently used for login. Further, the content server 106 may determine an electronic device (for example, the smart speaker 102) on which the audio B is being played, as the source device on which the audio content B is played.

Certainly, if a first playing switchover request carries a source device (for example, the smart speaker 102) designated by the user, and the audio content B is being played (that is, an audio playing service is ongoing) on the smart speaker 102 under an account A, the content server 106 may determine that a source device on which the audio B is played under the first account is the smart speaker 102.

After the content server 106 determines that the source device on which the audio B is played is the smart speaker 102, the content server 106 may query for a playing progress of the audio B on the smart speaker 102, so that the mobile phone 101 can continue playing the audio B from a current playing location after the audio B is subsequently switched to the smart speaker 102.

The content server 106 sends the resource information and the playing progress of the audio B to the mobile phone 101. The mobile phone 101 continues playing the audio B based on the resource information and the playing progress of the audio B.

After obtaining the playing progress of the audio content B on the smart speaker 102, the content server 106 may send the playing progress and the resource information of the audio B to the mobile phone 101. In this way, the mobile phone 101 may obtain the audio B based on the resource information of the audio B, and the mobile phone 101 may continue playing the audio B from a current playing location of the smart speaker 102 based on the playing progress of the audio B, thereby implementing seamless switchover of an audio playing service between the smart speaker 102 and the mobile phone 101. After the mobile phone 101 receives the video B, the content server may automatically interrupt the audio playing service of playing the audio B on the smart speaker 102.

In some other embodiments, the mobile phone 101 may send a playing event of the audio B to the content server 106 through the network 109. In response to the playing event, the content server 106 interrupts the audio playing service of playing the audio B on the smart speaker 102.

After the mobile phone 101 starts to play the audio B, the audio B originally played on the smart speaker 102 may not be automatically interrupted. In this case, after the mobile phone 101 starts to play the audio B, the mobile phone 101 may automatically send a playing event of the audio B to the content server 106. In this way, after receiving the playing event, the content server 106 can stop the audio playing service on the smart speaker 102. For example, in response to the playing event reported by the mobile phone 101, the content server 106 may send a playing stop instruction to the smart speaker 102, so that the smart speaker 102 stops, in response to the playing stop instruction, playing the audio B on the smart speaker 102.

In some other embodiments, it may be set that playing of the audio B on the smart speaker 102 is stopped after the smart speaker 102 and the mobile phone 101 simultaneously play the audio B for a period of time. For example, the mobile phone 101 may send a playing event of the audio B to the content server 106 after playing the audio B for 3 s. In this case, within 3 s after the mobile phone 101 starts to play the audio content B, the smart speaker 102 also plays the audio B simultaneously. In this way, even if some audio is missed due to a transmission delay after the audio playing service is switched to the mobile phone 101, the user can obtain complete audio content with reference to the audio B played on the smart speaker 102, thereby increasing voice switchover efficiency and improving use experience.

In the voice switchover method provided in the foregoing embodiment, a source device for the audio playing service is the smart speaker 102, and a target device for the audio playing service is the mobile phone 101. The mobile phone 101 can identify, in response to a trigger operation performed by the user, a requirement of switching the audio playing service. Further, the mobile phone 101 may send the first playing switchover request to the content server 106, and the content server 106 seamlessly switches an audio playing service ongoing on the smart speaker 102 under a same account to the mobile phone 101 for continuing the audio playing service. In a switchover process, the audio playing service is not interrupted, and the user does not need to perform repeated operations between a plurality of devices, thereby increasing efficiency of voice switchover between the plurality of devices and improving user experience.

In some other application scenarios, after a user logs in to the device management server 103 on the mobile phone 101 and the smart speaker 102 by using a same account, the user may use the smart speaker 102 to execute an audio playing service. If the user expects to switch the audio playing service from the smart speaker 102 to the mobile phone 101, the user may alternatively perform a preset specific operation on the smart speaker 102, to trigger the content server 106 to switch the audio playing service from the smart speaker 102 to the mobile phone 101. The specific operation may be a voice input performed by the user on the smart speaker 102. For example, the user says "Switch the song Silence to the mobile phone for playing" to the smart speaker 102. For a manner of processing the voice input by the smart speaker 102, refer to related descriptions in the foregoing embodiment. Details are not described herein again.

In some other application scenarios, when a user uses the mobile phone 101 to execute an audio playing service, if the user subsequently expects to switch the audio playing service from the mobile phone 101 to the smart speaker 102, the user may perform a preset input operation on the smart speaker 102/or the mobile phone 101, to trigger the content server 106 to switch the audio playing service from the mobile phone 101 to the smart speaker 102. For details, refer to the descriptions in the foregoing embodiment. Details are not described herein again.

Figure 9:
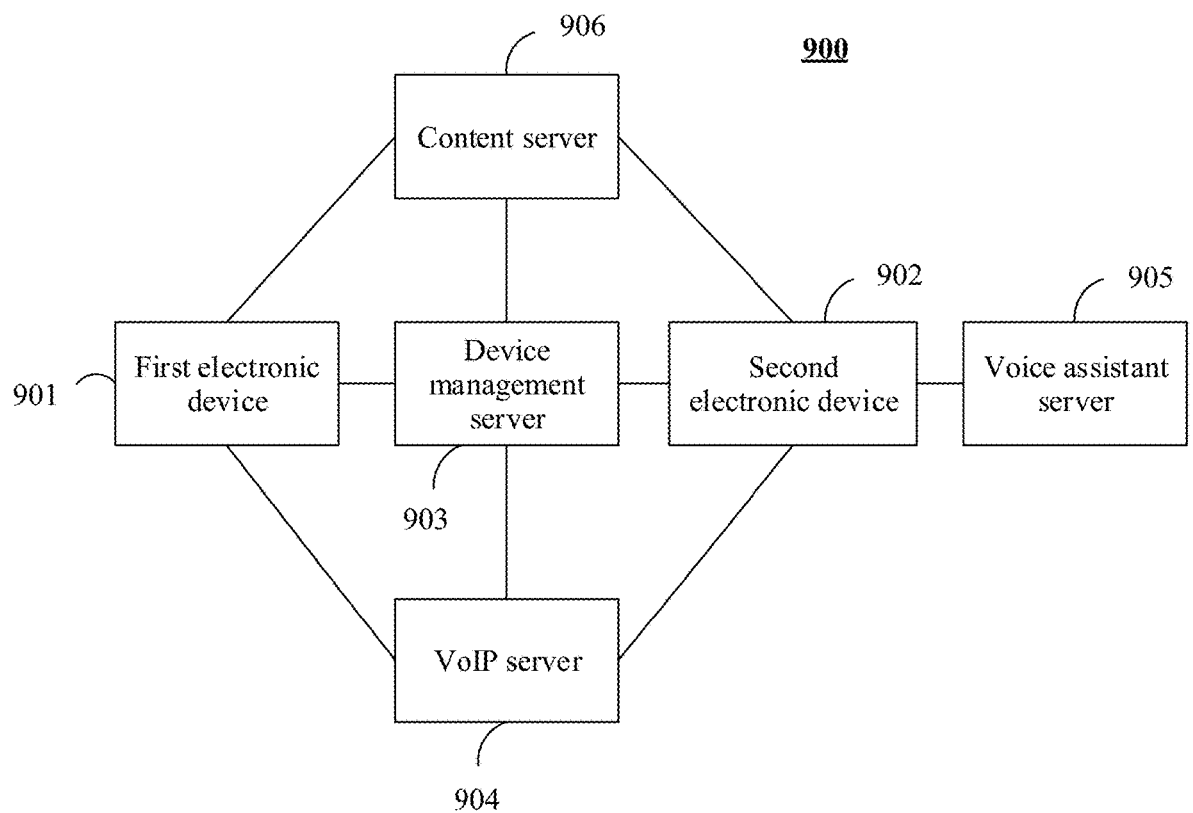
FIG. 9 is a schematic structural diagram of a voice switchover system according to an embodiment.

As shown in FIG. 9, an embodiment provides a voice switchover system 900. The system 900 may include a first electronic device 901 (for example, the mobile phone 101 in FIG. 1), a second electronic device 902 (for example, the smart speaker 102 in FIG. 1), a device management server 903 (for example, the device management server 103 in FIG. 1), and a VoIP server 904 (for example, the VoIP server 104 in FIG. 1). The system 900 may be configured to implement the technical solutions of voice switchover in the foregoing embodiments, and details are not described herein again.

In some other embodiments, the system 900 may further include a voice assistant server 905 (for example, the voice assistant server 105 in FIG. 1) and a content server 906 (for example, the content server 106 in FIG. 1). A function of the voice assistant server 905 is the same as a function of the voice assistant server 105 in the foregoing embodiment, and a function of the content server 906 is the same as a function of the content server 106 in the foregoing embodiment.

The foregoing descriptions about implementations allow a person skilled in the art to clearly understand that, for the purpose of convenient and brief description, division into the foregoing functional modules is used as an example for illustration. In actual application, the foregoing functions can be allocated to different modules and implemented based on requirements, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described according to the embodiments of this application are generated. The computer may be a general-purpose computer, a dedicated computer, a computer network, or another programmable apparatus. The computer instructions may be stored in the computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive), or the like.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A voice switchover method, comprising:
   detecting, by a second electronic device, a voice input of a user;
   in response to the voice input, establishing, by the second electronic device, a voice over internet protocol (VoIP) call with a third electronic device through a VoIP server;
   sending, by a first electronic device, first switchover request information to the VoIP server requesting the VoIP server to switch the VoIP call ongoing on the second electronic device to the first electronic device, the first switchover request information comprises a first account for logging into a device management server;
   receiving, by the VoIP server, the first switchover request information;
   in response to the first switchover request information, determining, by the VoIP server, that a source device for a VoIP service corresponding to the first account is the second electronic device; and
   switching, by the VoIP server, the VoIP call ongoing on the second electronic device to the first electronic device.

2. The voice switchover method according to claim 1, wherein prior to the detecting the voice input of the user, the method further comprises: using the first account to log into the device management server on both the first electronic device and the second electronic device.

3. The voice switchover method according to claim 1, wherein the sending, by the first electronic device, first switchover request information to the VoIP server comprises:
   when the first electronic device detects a specific operation of the user, sending, by the first electronic device, the first switchover request information to the VoIP server in response to the detection of the specific operation.

4. The voice switchover method according to claim 3, wherein the specific operation is one of the following operations: flipping a mobile phone, tapping a screen with a knuckle, double-tapping a power key, a preset voice input, or a preset sliding gesture.

5. The voice switchover method according to claim 1, wherein the sending, by the first electronic device, first switchover request information to the VoIP server comprises:
when the first electronic device detects a specific condition, sending, by the first electronic device, the first switchover request information to the VoIP server in response to the detection of the specific condition.

6. The voice switchover method according to claim 5, wherein the specific condition is wireless fidelity (Wi-Fi) signal strength in a wireless local area network (WLAN) or Bluetooth signal strength; and
when the first electronic device detects that the Wi-Fi signal strength is less than a preset threshold, the first electronic device sends the first switchover request information to the VoIP server; or
when the first electronic device detects that the Bluetooth signal strength of the second electronic device is less than a preset threshold, the first electronic device sends the first switchover request information to the VoIP server.

7. The voice switchover method according to claim 1, wherein the method further comprises:
sending, by the first electronic device to the VoIP server, a response message indicating that the first electronic device successfully joins in the VoIP call; and
interrupting, by the VoIP server, the VoIP service on the second electronic device after receiving the response message.

8. The voice switchover method according to claim 1, wherein the determining, by the VoIP server, that the source device for the VoIP service corresponding to the first account is the second electronic device comprises:
sending, by the VoIP server, the first account to the device management server;
determining, by the device management server based on the first account, at least one electronic device on which the first account is used for login;
sending, by the device management server, a device identity of the at least one electronic device to the VoIP server; and
determining, by the VoIP server based on the device identity, that the source device on which the VoIP call is ongoing under the first account is the second electronic device.

9. The voice switchover method according to claim 8, wherein the determining that the source device on which the VoIP call is ongoing under the first account is the second electronic device comprises:
when the VoIP server determines, based on the device identity, that there are at least two electronic devices for the source device on which the VoIP call is ongoing under the first account, sending, by the VoIP server, device identities of the at least two electronic devices to the first electronic device;
displaying, by the first electronic device, at least two options indicating the at least two electronic devices;
detecting, by the first electronic device, a selection operation performed by the user on one of the at least two options indicating selection of the second electronic device;
sending, by the first electronic device, a device identity of the second electronic device to the VoIP server in response to the selection operation; and determining, by the VoIP server based on the received device identity of the second electronic device, that the source device on which the VoIP call is ongoing under the first account is the second electronic device.

10. The voice switchover method according to claim 1, wherein the method further comprises:
detecting, by the second electronic device, a first operation;
in response to the first operation, sending, by the second electronic device, second switchover request information to the VoIP server requesting the VoIP server to switch the VoIP call ongoing on the first electronic device to the second electronic device, the first switchover request information comprises the first account;
receiving, by the VoIP server, the second switchover request information;
in response to the second switchover request information, determining, by the VoIP server, that a source device for a VoIP service corresponding to the first account is the first electronic device; and
switching, by the VoIP server, the VoIP call ongoing on the first electronic device to the second electronic device.

11. A voice switchover system, comprising:
a second electronic device configured to: when detecting a voice input of a user, establish a voice over internet protocol (VoIP) call with a third electronic device through a VoIP server;
a first electronic device configured to: send first switchover request information to the VoIP server requesting the VoIP server to switch the VoIP call ongoing on the second electronic device to the first electronic device, the first switchover request information comprises a first account for logging into a device management server; and
wherein the VoIP server is configured to: receive the first switchover request information, determine that a source device for a VoIP service corresponding to the first account is the second electronic device, and switch the VoIP call ongoing on the second electronic device to the first electronic device.

12. The voice switchover system according to claim 11, wherein the first account is used to log into the device management server on both the first electronic device and the second electronic device.

13. The voice switchover system according to claim 11, wherein the first electronic device is further configured to:
when detecting a specific operation of the user, send the first switchover request information to the VoIP server, wherein
the specific operation is one of the following operations: flipping a mobile phone, tapping a screen with a knuckle, double-tapping a power key, a preset voice input, or a preset sliding gesture.

14. The voice switchover system according to claim 11, wherein the first electronic device is further configured to:
when the first electronic device detects a specific condition, the first electronic device sends the first switchover request information to the VoIP server.

15. The voice switchover system according to claim 14, wherein the specific condition is wireless fidelity (Wi-Fi) signal strength in a wireless local area network (WLAN) or Bluetooth signal strength; and
when the first electronic device detects that the Wi-Fi signal strength is less than a preset threshold, the first electronic device sends the first switchover request information to the VoIP server; or when the first electronic device detects that the Bluetooth signal strength of the second electronic device is less than a preset threshold, the first electronic device sends the first switchover request information to the VoIP server.

16. The voice switchover system according to claim 11, wherein the first electronic device is further configured to send, to the VoIP server, a response message indicating that the first electronic device successfully joins in the VoIP call; and the VoIP server is further configured to interrupt the VoIP service on the second electronic device after receiving the response message.

17. The voice switchover system according to claim 11, wherein the VoIP server determining that the source device for the VoIP service that corresponds to the first account is the second electronic device comprises:

the VoIP server sends the first account to the device management server;

the device management server determines, based on the first account, at least one electronic device on which the first account is used for login;

the device management server sends a device identity of the at least one electronic device to the VoIP server; and the VoIP server determines, based on the device identity, that a source device on which a VoIP call is ongoing under the first account is the second electronic device.

18. The voice switchover system according to claim 17, wherein the VoIP server is further configured to: when determining, based on the device identity, that there are at least two electronic devices for the source device on which the VoIP call is ongoing under the first account, send device identities of the at least two electronic devices to the first electronic device;

the first electronic device is further configured to display at least two options that indicate the at least two electronic devices;

the first electronic device detects a selection operation performed by the user on one of the at least two options indicating selection of the second electronic device;

the first electronic device is further configured to send a device identity of the second electronic device to the VoIP server; and the VoIP server is further configured to determine, based on the received device identity of the second electronic device, that the source device on which the VoIP call is ongoing under the first account is the second electronic device.

19. The voice switchover system according to claim 11, wherein the first electronic device is a mobile phone, and the second electronic device is a smart speaker provided with a voice assistant system.

20. The voice switchover system according to claim 11, wherein the second electronic device is further configured to: when detecting a first operation, send second switchover request information to the VoIP server requesting the VoIP server to switch the VoIP call ongoing on the first electronic device to the second electronic device, the first switchover request information comprises the first account; and the VoIP server is further configured to: receive the second switchover request information, determine that a source device for a VoIP service corresponding to the first account is the first electronic device, and switch the VoIP call ongoing on the first electronic device to the second electronic device.

* * * * *